US012701042B2

(12) United States Patent　　　　(10) Patent No.:　US 12,701,042 B2
Kasap　　　　　　　　　　　　　　　(45) Date of Patent:　　　Aug. 4, 2026

(54) AUTOMATED ROOT CAUSE DETERMINATION USING A PRE-TRAINED GENERATIVE MODEL

(71) Applicant: Microsoft Technology Licensing, LLC, Redmond, WA (US)

(72) Inventor: Mustafa Kasap, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 508 days.

(21) Appl. No.: 18/206,753

(22) Filed: Jun. 7, 2023

(65) Prior Publication Data

US 2024/0414048 A1　　Dec. 12, 2024

(51) Int. Cl.
| | |
|---|---|
| *H04L 41/0631* | (2022.01) |
| *G06F 11/362* | (2025.01) |
| *G06F 40/166* | (2020.01) |
| *G06F 40/40* | (2020.01) |

(52) U.S. Cl.
CPC .......... *H04L 41/065* (2013.01); *G06F 11/366* (2013.01); *G06F 40/166* (2020.01); *G06F 40/40* (2020.01)

(58) Field of Classification Search
CPC .... H04L 41/065; G06F 11/366; G06F 40/166; G06F 40/40; G06F 9/453; G06N 3/045
USPC ....................................................... 717/126
See application file for complete search history.

(56) References Cited

U.S. PATENT DOCUMENTS

| | | | | |
|---|---|---|---|---|
| 11,188,411 B1 * | 11/2021 | Shen | .................... | G06N 3/0499 |
| 12,282,305 B2 * | 4/2025 | Brown | .................. | G05B 15/02 |
| 12,323,449 B1 * | 6/2025 | Graves | ...................... | G06F 8/75 |
| 2020/0344249 A1 * | 10/2020 | Mohan | .................... | H04L 63/20 |
| 2022/0358005 A1 * | 11/2022 | Saha | ...................... | G06F 40/216 |
| 2024/0070130 A1 * | 2/2024 | Niyazov | ............. | G06F 16/2365 |

OTHER PUBLICATIONS

Lin, Bor-Shing, et al. "Fall detection system with artificial intelligence-based edge computing." IEEE Access 10 (2022): pp. 4328-4339. (Year: 2022).*
Zhou, Zhi, et al. "Edge intelligence: Paving the last mile of artificial intelligence with edge computing." Proceedings of the IEEE 107.8 (2019): pp. 1738-1762. (Year: 2019).*

(Continued)

*Primary Examiner* — Satish Rampuria

(57)　　　　　　ABSTRACT

Systems and methods are provided for determining a root cause of an incident that occurred in a 5G/6G multi-access edge computing and core network system. In particular, the disclosed technology is directed to using a pre-trained generative model to determine the root cause for an incident as recorded in event data of a system log. The present disclosure generates a prompt for the generative model to determine the root cause for an incident as recorded in the system log. The prompt comprises a combination including event data from a system log, function hierarchy graph data, and function information as grounding information in a prefix of the prompt. The prompt further includes a question that requests determining a root cause of an incident as recorded in the event data. An answer as generated by the pre-trained generative model indicates of the root cause and a function call associated with the incident.

20 Claims, 14 Drawing Sheets

(56) References Cited

OTHER PUBLICATIONS

Wang, Xiaofei, et al. "Convergence of edge computing and deep learning: A comprehensive survey." IEEE communications surveys & tutorials 22.2 (2020): pp. 869-904. (Year: 2020).*

Gan, Yu, et al. "Sleuth: A trace-based root cause analysis system for large-scale microservices with graph neural networks." Proceedings of the 28th ACM International Conference on Architectural Support for Programming Languages and Operating Systems, vol. 4. 2023. pp. 324-337. (Year: 2023).*

Cheng, Qian, et al. "Ai for it operations (aiops) on cloud platforms: Reviews, opportunities and challenges." arXiv preprint arXiv:2304. 04661 (2023). pp. 1-34. (Year: 2023).*

Zhang, Dylan, et al. "Pace-Im: Prompting and augmentation for calibrated confidence estimation with gpt-4 in cloud incident root cause analysis." arXiv preprint arXiv:2309.05833 (2023). pp. 1-21. (Year: 2023).*

Chen, et al., "Empowering Practical Root Cause Analysis by Large Language Models for Cloud Incidents", arXiv preprint arXiv:2305. 15778, May 25, 2023, pp. 1-15.

International Search Report and Written Opinion received for PCT Application No. PCT/US2024/031522, Sep. 16, 2024, 14 pages.

Melo, et al., "On a Feature-Oriented Characterization of Exception Flows in Software Product Lines", 26th Brazilian Symposium on Software Engineering—IEEE, Sep. 23, 2012, pp. 121-130.

Nguyen, et al., "Recommendation of Exception Handling Code in Mobile App Development", arXiv preprint arXiv:1908.06567, Aug. 19, 2019, 12 pages.

* cited by examiner

Figure 3A:
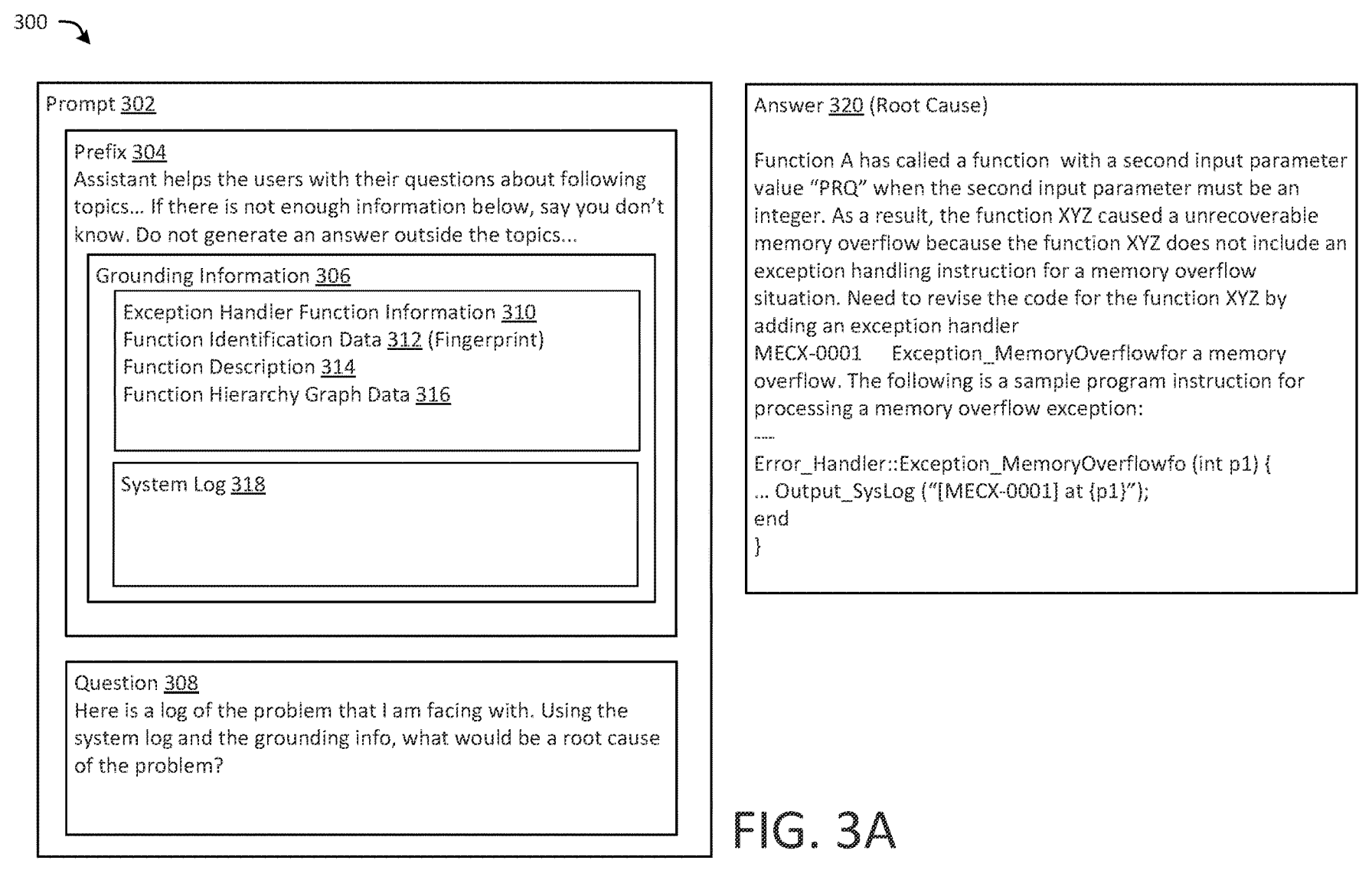

Answer 320 (Root Cause)

Function A has called a function with a second input parameter value "PRQ" when the second input parameter must be an integer. As a result, the function XYZ caused a unrecoverable memory overflow because the function XYZ does not include an exception handling instruction for a memory overflow exception. Need to revise the code for the function XYZ by adding an exception handler MECX-0001 Exception_MemoryOverflow for a memory overflow. The following is a sample program instruction for processing a memory overflow exception:

Error_Handler::Exception_MemoryOverflowfo (int p1) {
... Output_SysLog ("[MECX-0001] at {p1}");
end
}

Prompt 302

Prefix 304
Assistant helps the users with their questions about following topics... If there is not enough information below, say you don't know. Do not generate an answer outside the topics...

Grounding Information 306

Exception Handler Function Information 310
Function Identification Data 312 (Fingerprint)
Function Description 314
Function Hierarchy Graph Data 316

System Log 318

Question 308
Here is a log of the problem that I am facing with. Using the system log and the grounding info, what would be a root cause of the problem?

| Function Identifier 350 | Function Name 352 | Description 354 |
|---|---|---|
| MECX-0001 | Exception_MemoryOverflow | Exception_MemoryOverflow function processes a memory overflow exception in an edge server |
| MECX-0002 | Exception_InvalidVariableType | Exception_InvalidVariableType function processes an exception as an invalid variable type |

430 — RETRIEVE CODE IN PROGRAM INSTRUCTION

432 — GENERATE PROMPT INCLUDING CODE AS GROUNDING INFORMATION AND QUESTION

434 — TRANSMIT PROMPT FOR SUMMARY OF PROGRAM INSTRUCTION

436 — RECEIVE SUMMARY TEXT OF CODE IN PROGRAM INSTRUCTION

438 — DISPLAY RESULT

440 — UPDATE CODE OF PROGRAM INSTRUCTION BY ADDING THE SUMMARY

A

400C

450 — RETRIEVE CODE OF PROGRAM INSTRUCTION

452 — RETRIEVE EXCEPTION HANDLER FUNCTION TABLE

454 — GENERATE PROMPT FOR RECOMMENDED EXCEPTION HANDLER FUNCTION

456 — TRANSMIT PROMPT FOR RECOMMENDED EXCEPTION HANDLER FUNCTION

458 — RECEIVE RECOMMENDED EXCEPTION HANDLER FUNCTION

460 — UPDATE CODE BASED ON THE RECOMMENDED FUNCTION

B

400D

470 — RETRIEVE CODE WITH COMMENTS AND EXCEPTION HANDLER FUNCTIONS AND IDENTIFIERS ( FINGERPRINTS)

472 — RETRIEVE EXCEPTION HANDLER FUNCTION TABLE

474 — RECEIVE FUNCTION GRAPH

476 — RECEIVE SYSTEM LOG

478 — GENERATE GROUNDING INFORMATION PART

480 — GENERATE QUESTION

482 — GENERATE A PROMPT FOR ROOT CAUSE BASED ON THE QUESTION AND THE GROUNDING INFORMATION

C

AUTOMATED ROOT CAUSE DETERMINATION USING A PRE-TRAINED GENERATIVE MODEL

Performing a root cause analysis has been an important part of maintaining operations of systems for obvious reasons. For instance, understanding the root cause of a problem helps actually solve the problem efficiently and effectively. Performing the root cause analysis becomes increasingly complex as the systems grow in size and sophistication. In particular, finding a root cause of a problem that occurs in 5G, 6G, and other telecommunications networks is complex because there are hundreds of thousands of geographically distributed devices and servers that connect and communicate over the systems.

With the advent of 5G, Multi-access Edge Computing (MEC) with data analytics pipelines through a core network has become important to improve performance and reliability of cloud services. In MEC, there is a hierarchy of devices and servers. For instance, Internet-of-Things (IoT) devices, e.g., cameras of personal or commercial security systems, municipal traffic cameras, and the like, capture and transmit stream data (e.g., video data) to cell towers. The cell towers relay the stream data to edge servers in on-premises (i.e., "on-prem") edges as uplink data traffic. The on-premises edge servers transmit the uplink data traffic to network servers at network edges of a cloud infrastructure, and the network servers further transmit the uplink data traffic to cloud servers for processing.

Operators of the 5G, 6G, and other telecommunications networks capture statuses of various parts of the systems in system logs. The system logs may be geographically distributed and/or in cloud storage. While reviewing the system logs help may identify causes for some problems, the vast volume of the system logs that cover a variety of applications and services in the many systems makes the analysis time consuming and complex, and often inaccurate. Accordingly, there has been a need to identify a root cause efficiently and effectively for incidents, problems, and events that arise in the 5G, 6G, and other telecommunication networks.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to determining a root cause of a problem associated with executing program instructions for services in multi-access edge computing (MEC) systems in the 5G, 6G, and other telecommunication networks. In particular, the disclosed technology is directed to using a pre-trained generative model to generate a summary of at least a part of the program instructions and to recommend missing function codes with fingerprint data for inserting into a code of the program instructions. Given the natural language summary and functions with fingerprint data referenced from a system log, the disclosed technology determines a root cause of a problem in the 5G, 6G, and other telecommunication networks. A result of analyzing a root cause includes references to a part of a code of program instructions.

As noted above, the MEC involves a hierarchy of data centers and servers with a variety of services that are installed for execution. The MEC includes one or more edge servers in an on-premises edge datacenter of a private cloud network that may interface with a radio access network (RAN). In aspects, the term "on-premises edge" may refer to a datacenter at a remote location at the far-edge of a private cloud, which is in proximity to one or more cell towers. The RAN, in combination with a core network of a cloud service provider, represents a backbone network for mobile wireless telecommunications. For example, cell towers may receive and transmit radio signals to communicate with IoT devices (e.g., video cameras) over a RAN (e.g., 5G). Various service applications may perform different functions, such as network monitoring or video streaming, and may be responsible for evaluating data associated with the data traffic. For instance, a service application may perform data analytics, such as object recognition (e.g., object counting, facial recognition, human recognition) on a video stream. In aspects, the term "5G/6G MEC and core network system" includes the MEC and the core network system in the 5G or 6G telecommunication networks. In aspects, a program instruction includes one or more codes that expresses and executes as functions.

In aspects, the term "generative model" includes a pre-trained transformer model, a large language model, a machine learning language model, and the like. A generative model generates an answer to a given query or a prompt in a natural language text. The generative model includes a model that generates a code or a sample code as output according to a given description as input.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 3A illustrates an example of a prompt and an answer in accordance with aspects of the present disclosure.

FIG. 3C illustrates an example of a prompt and an answer in accordance with aspects of the present disclosure.

DETAILED DESCRIPTION

Figure 1:
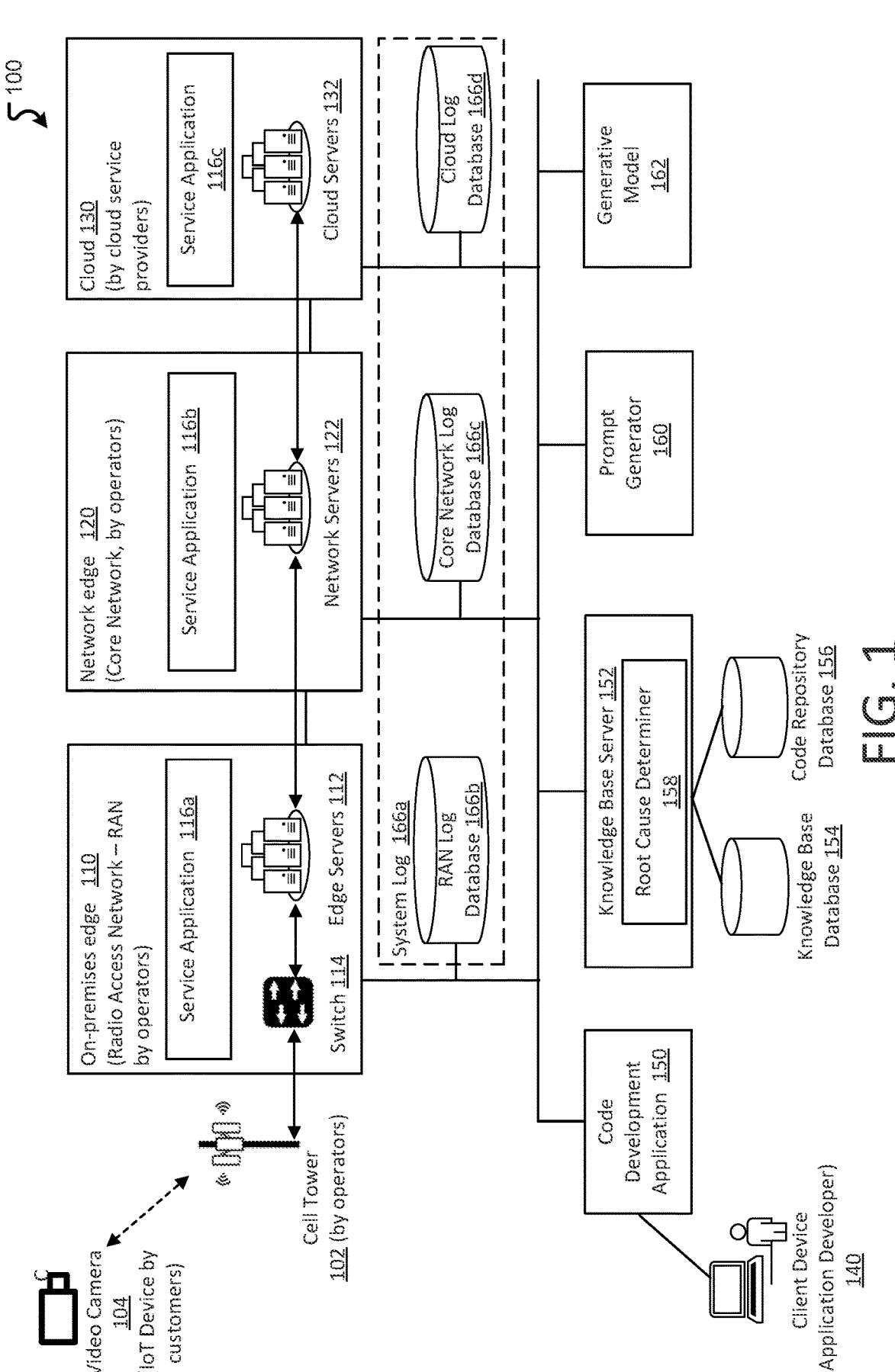
FIG. 1 illustrates an overview of an example system for determining root cause of a problem associated with MEC using a generative model in accordance with aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Distributed processing in a 5G/6G MEC and core network system is complex. IoT devices may transmit and receive data from cell towers, which may connect via cloud services to a public network (e.g., the Internet) and/or private networks. The cloud service provider may implement a vast array of virtual servers and other computing resources to dynamically scale computing capacity as needed based on the volume of data traffic. To enable real-time processing of data traffic, an on-premises edge server may be relatively close (e.g., a few kilometers) to a cell tower. However, due to the physical and geographical constraints associated with a RAN, the on-premises edge servers may include limited capacity in computing and memory resources as compared to network servers at the network edges and cloud servers in the cloud. Accordingly, the servers form a hierarchical structure with the distributed on-premises edges at the downstream end, the network edges in the middle, and the cloud servers at the root.

Determining a root cause of a problem in the 5G/6G MEC and core network system with accuracy has been resource intensive and time consuming. A vast number of parameters associated with program instructions and servers, which are physically distributed, makes the analysis complex. For example, a problem of an unexpected interruption to a phone call over the 5G/6G MEC and core network systems may arise. A root cause of the problem may be associated with one or more of a variety of areas (e.g., a subscriber status that terminated the call, the terminal device having moved outside the service cell, an antenna of the terminal device, a cell tower malfunction, a call connection management issue at an edge server, an issue of a hand-over operation between cells as the terminal device moves across cells, and the like). In aspects, the 5G/6G MEC and core network systems use one or more system logs to record operational statuses of respective parts of the 5G/6G MEC and core network systems. System logs may be stored in databases and retrievable by searching based on timestamps, service types, record types, and the like.

Problems that occur in the 5G/6G MEC and core network systems may be associated with a variety of root causes. For example, some program instruction of a service may be missing an exception handling function code in dividing numerical values. In some other examples, a root cause of a system failure is associated with a natural disaster (e.g., a strong wind that destroys a cell tower). Thus, there has been a need to efficiently and accurately identify a root cause of a problem based on past occurrences of similar incidents and also with reference to codes of program instruction when the root cause is associated with a specific code.

The present disclosure includes a co-pilot, which represents a virtual assistant for identifying a root cause and facilitate code development. In aspects, the co-pilot automatically generates a summary text as a comment for a code snippet for insertion into a code. In some other aspects, the co-pilot recommends functions that are missing from the code. In yet some other aspects, the co-pilot identifies a code associated with a root cause of a problem or an error that occurs in the 5G/6G MEC and core network system based on event data in a system log.

Embodiments described herein relate to the use of a knowledge server that stores information associated with function calls used by codes in program instructions. The information associated with function calls include descriptions in a natural language text, an identifier (e.g., fingerprint data) that identify the respective function calls and function hierarchy graph data. The function hierarchy graph indicates caller-callee relationships among function calls and input/output parameters associated with the respective function calls. The knowledge server further adds fingerprint data and summary texts to code, thereby maintaining codes consistent across multiple authors and developers using a variety of programming languages to develop codes.

In aspects, some embodiments described herein use a generative model to automatically generate summary texts for codes, identify missing functions (e.g., exception handler functions) in the codes, and determine a root cause for a problem or an event that has been recorded in a system log. In some aspects, the generative model is pre-trained using a limited type or amount of information. That is, the use of generative models (e.g., a generative language model, a large language model, a generative transformer model, and the like) has become popular to generate an answer to a natural language prompt. In some aspects, the generative model is pre-trained. As described in more detail below, the present disclosure generates a prompt that is specifically designed to include a function call table with fingerprint data, a function hierarchy graph, and a system log, as grounding information. Use of the generative model with this specifically designed prompt as the grounding information will enable the generative model to determine, with efficiency and with accuracy, a root cause of a problem in the complex systems. The grounding information in the prompt retrains answers from the generative model to a specific domain.

FIG. 1 illustrates an overview of an example system for determining a root cause of a problem associated with the 5G/6G MEC and core network system using a generative model in accordance with aspects of the present disclosure. Cell tower 102 transmits and receives wireless communications with IoT devices (e.g., video cameras, health monitors, watches, appliances, etc.) over a telecommunications network. Video camera 104 represents an example of IoT devices communicating with at least the cell tower 102 in the field. In aspects, the video camera 104 are capable of capturing video images and transmitting the captured video images over a wireless network (e.g., the 5G/6G cellular network) to the cell tower 102. For example, at least the video camera 104 may capture scenes for purposes of video surveillance, such as traffic surveillance or security surveillance. The example system 100 further includes an on-premises edge 110 (including switches and edge servers), a network edge 120 (including core network servers), and a cloud 130 (including cloud servers responsible for providing cloud services). In aspects, the example system 100 corresponds to a cloud RAN infrastructure for a mobile wireless telecommunication network.

As illustrated, the on-premises edge 110 is a datacenter that is part of a cloud RAN, which includes service application 116a. In aspects, the on-premises edge 110 enables cloud integration with a radio access network (RAN). The on-premises edge 110 includes a switch 114 and edge servers 112. The switch 114 and the edge servers 112 process incoming data traffic and outgoing data traffic. The edge servers 112 execute service application 116a. In aspects, the on-premises edge 110 is generally geographically remote from the cloud datacenters associated with the core network and cloud services. The remote site is in geographic proximity to the cell towers. For example, the proximity in the present disclosure may be within about a few kilometers. In aspects, the upstream data traffic corresponds to data flowing from at least the cell tower 102 to cloud servers 132 in the cloud 130 (service). Similarly, the downstream data traffic corresponds to data flowing from the cloud 130 (service) to the cell tower. In further aspects, regional datacenters that support the cloud 130 may serve a broad geographic area and the cloud server resources (including processing units and memory) may be more robust and powerful than the edge servers 112 and the network servers 122. As an example, the cloud servers 132 may be more powerful than the network servers 122 and edge servers 116, which may be more powerful than the edge servers 112.

In aspects, the network edge 120 (e.g., hosting the core network) includes service application 116b, which may perform video analytics and/or video transformations. In aspects, the network edge 120 includes servers that are geographically located at a regional datacenter of a private cloud service. For example, the regional datacenter may be about tens of kilometers from the cell tower 102.

The cloud 130 is supported by cloud servers 132 and other distributed resources for providing resource-intensive service operations. In aspects, one or more servers in the cloud 130 may be at a central location in a cloud RAN infrastructure. In this case, the central locations may be hundreds of kilometers from the cell tower 102. In aspects, the cloud 130 includes service application 116c for performing video analytics. The service application 116c may perform similar processing tasks as the service application 116b in the network edge 120, but may have access to more processing and memory resources in the cloud 130. However, the cloud servers 132, which are even further removed from users, may offer a reduced level of real-time processing in response to captured user data.

The service application 116a includes program instructions for processing data according to predetermined data analytics scenarios on the edge servers 112. The service application 116b in the network edge 120 has more computational and memory resources to perform video processing that is more resource intensive and complex than the service application 116a at the on-premises edge 110.

In aspects, system log 166a receives event data from various parts of the system 100, including one or more service applications (e.g., the service application 116a, 116b, and 116c) and other executables and devices in the cell tower 102, the on-premises edge 110, the network edge 120, and the cloud 130. The system log 166a stores the event data. The event data indicate a variety of types events, including but not limited to a device status, a warning, and an error. For example, the system log 166a includes RAN log database 166b, core network log database 166c, and cloud log database 116d. The RAN log database 166b receives and stores event data from the on-premises edge 110. The core network log database 166c receives and stores event data from the network edge 120. The cloud log database 166d receives and stores event data from the cloud 130. The respective event data may include information associated with statuses, warnings, and errors that have occurred in one or more of respective components of the service application 116a in the on-premises edge 110, the service application 116b in the network edge 120, and the service application 116c the cloud 130. Additionally, or alternatively, the system log 166a may receive and store event data associated with operating the cell tower 102 and the video camera 104.

In aspects, event data includes a timestamp associated with an event, a type of the event (e.g., a status of a server and/or an application, a warning, an error, and the like), an identifier associated with program instruction (e.g., a code) as fingerprint data, descriptions of the event, and the like. The event data in the system log 166a may be retrievable by knowledge base server 152 for subsequent operations of a root cause analysis of an event.

The system 100 further includes code development application 150, knowledge base server 152, prompt generator 160, generative model 162, and client device 140. The code development application 150 provides user interface to enable an application developer at client device 140 to develop function codes for program instructions for deployment. The knowledge base server 152 stores knowledge base associated with program instructions in the system 100. The knowledge base server 152 includes root cause determiner 158.

The root cause determiner 158 determines a root cause of a problem as indicated in the system log 166a by communicating with the prompt generator 160 and the generative model 162. The prompt generator 160 generates a prompt in a natural language and transmits the prompt to the generative model 162. The prompt generator 160 requests the generative model 162 to generate, based on the prompt, a natural language text that describes a root cause of a problem in the system 100 as an answer. In aspects, the root cause determiner 158 retrieves event data from the system log 166a, which indicate a problem that has occurred in the system 100. The prompt generator 160 further adds function table data and a question text to the prompt. In aspects, the function table data includes a list of functions (e.g., exception handler functions) and identifiers associated with the respective functions. The question text describes a request for a root cause for a problem found in the log data using the generative model 162.

Additionally, or alternatively, the knowledge base server 152 inserts a natural language summary text to a function code of program instruction. In particular, the knowledge base server requests the prompt generator 160 to generate a prompt to request the generative model 162 to generate a natural language summary associated with a given function code of the program instruction. In aspects, the prompt includes at least a part of function code from which a summary text is to be generated. The prompt generator 160 sends the generated prompt to the generative model 162. The generative model 162, based on the prompt, generates a natural language summary text for insertion into the function code.

In some aspects, the knowledge base server 152 identifies and recommends a missing function code into a program instruction. For example, the program instruction may be missing an exception handler function code (e.g., an error handling function to process a memory overflow exception). The knowledge base server 152 requests the prompt generator 160 to generate a prompt to request the generative model 162 to generate a natural language recommendation, which identifies and recommends one or more function code that needs to be inserted in code of a given program instruction. In aspects, the prompt generator 160 may generate a prompt by combining a list of exception handler function codes as grounding information and the program instruction.

In aspects, the knowledge base server 152 connects with knowledge base database 154 and code repository database 156. The knowledge base database 154 stores data associated with features and policies for developing and maintaining codes of program instruction for at least a part of the 5G/6G MEC and core network systems. For example, the knowledge base database 154 stores a list of exception handler functions with and identifiers (e.g., fingerprint data) and descriptions of the respective exception handler functions (e.g., an exception handler function table as described in detail below; see, FIG. 3C). The code repository database 156 stores function code for program instructions for the 5G/6G MEC and core network systems.

The generative model 162 receives a prompt in a natural language and generates a natural language response that answers the prompt. The generative model 162 may be pre-trained. In aspects, the generative model may be based on a transformer model.

In some aspects, when the application developer (e.g., an engineer) checks in a code into the code repository database 156, the knowledge base server 152 may automatically generate summary texts to one or more parts of the code and inserts the summary data as comments. The knowledge base server 152 may further identify identifiers (e.g., fingerprint data) associated with exception handler and other functions and inserts the identifiers into the exception handler function table and to the code.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
FIG. 2 illustrates an example system for determining a root cause using a knowledge server and a generative model in accordance with aspects of the present disclosure.

FIG. 2 illustrates an example system for determining a root cause using a knowledge server and a generative model in accordance with aspects of the present disclosure. The system 200 includes code development application 202, knowledge base server 210, and generative model 224. The code development application 202 (e.g., the code development application 150 as shown in FIG. 1) provides interactive user interface to create and edit code for program instructions. In aspects, the code development application 202 includes code snippet summary inserter 204, code editor 206, and co-pilot 208. The code snippet summary inserter 204 requests for a summary text for a code snippet to the knowledge base server 210 and receives the summary text. In aspects, the summary text may be generated by the generative model 224 based on a given code snippet. In some aspects, the code snippet summary inserter 204 may request a summary text associated with a code snippet to a knowledge base server 210. The knowledge base server 210 may interact with the generative model 224 to receive the summary text for insertion into the code.

The code editor 206 outputs code for program instructions and interactively receive edits to the code from a code developer (e.g., a user using a client device). In some aspects, the code editor 206 may request the knowledge base server 210 to identify one or more missing function code for the code and output the missing function code for insertion the code editor 206. For example, the code editor 206 may request for one or more missing exception handler function code in a given code and insert received exception handler function code into the code.

The co-pilot 208 represents an interactive digital assistant to a code developer in developing codes in the code development application 202. In particular, the co-pilot 208 interactively suggests summary text data for code snippets and recommends missing function calls for insertion. The co-pilot may display a result of a root cause analysis as performed by the generative model.

The knowledge base server 210 includes function identifier 212 and root cause determiner 214. The knowledge base server 210 further connects to a system log database 230 and retrieves system log data from the system log database 230. The function identifier 212 identifies one or more function codes in a given code for a program instruction. In aspects, the function identifier 212 generates entries for an exception handler function table 216. The exception handler function table 216 includes a list of exception handler functions called by codes in program instructions for the 5G/6G MEC and core network systems (e.g., the system 100 as shown in FIG. 1). In aspects, the exception handler function table 216 includes an identifier (e.g., fingerprint data of the exception handler function) associated with an exception handler function, a name of the exception handler function, and a summary text associated with the exception handler function. The knowledge base server 210 may further include function hierarchy graph 218. The function hierarchy graph 218 indicates hierarchical relationships and dependencies among functions in program instructions in the 5G/6G MEC and core network systems. In aspects, the knowledge base server 210 may automatically generate the function hierarchy graph 218 by parsing codes in program instructions.

The root cause determiner 214 determines a root cause for a given problem in the 5G/6G MEC and core network systems. In aspects, the root cause determiner 214 retrieves system log data with an error (e.g., a problem that has occurred) from the system log database 230. The root cause determiner 214 generates, based on the retrieved system log data and the exception handler function table 216, a prompt 220 to request the generative model 224 to determine a root cause for the error. The root cause determiner 214 subsequently receives a response that includes a root cause description 222 in a natural language from the generative model 224. In aspects, the root cause description 222 includes an identifier as fingerprint data associated with a code that has caused the error to occur. The root cause determiner 214 determines a root cause based on the root cause description 222 and notifies the code development application 202 about the root cause of the error.

As will be appreciated, the various methods, devices, applications, features, etc., described with respect to FIG. 2 are not intended to limit the system 200 to being performed by the particular applications and features described. Accordingly, additional controller configurations may be used to practice the methods and systems herein and/or features and applications described may be excluded without departing from the methods and systems disclosed herein.

Figure 3B:
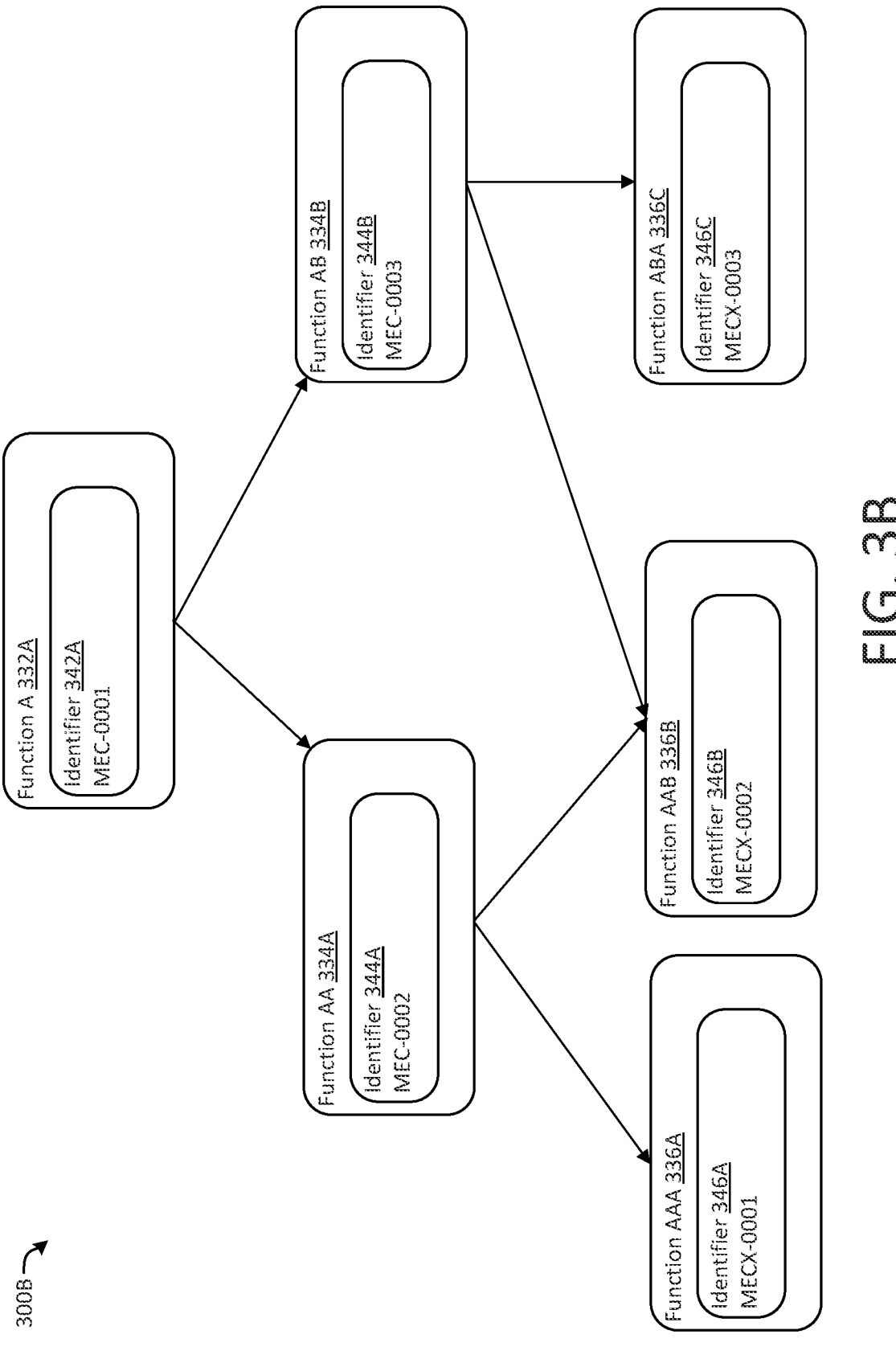
FIG. 3B illustrates an example of a function hierarchy graph data in accordance with aspects of the present disclosure.

FIGS. 3A-C illustrate examples of data associated with determining a root cause of a problem associated with 5G networks using a generative model in accordance with the aspects of the present disclosure. FIG. 3A illustrates an example of a prompt and an answer in accordance with aspects of the present disclosure. Example 300A includes prompt 302 and answer 320. The prompt comprises prefix 304 and question 308. The prefix 304 further includes grounding information 306. For example, the prefix 304 of the prompt 302 may indicate "[A]n assistant helps the users with their questions about following topic. If there is not enough information below, say you do not know. Do not generate an answer outside the topics." Based on texts in the prefix 304 of the prompt 302, the generative model restricts an answer to the question 308 and avoids generating an answer outside the topics as specified by the prefix 304.

The grounding information 306 indicates conditions and restrictions associated with generating an answer to the question 308. For example, the grounding information 306 include exception handler function information 310 (e.g., the exception handler function table 216 as shown in FIG. 2), function identification data 312 (fingerprint data), function description 314, and function hierarchy graph data 316 (e.g., the function hierarchy graph 218 as shown in FIG. 2), and a system log 318 (e.g., the system log 166a as shown in FIG. 1).

The question 308 indicates a query to the generative model to generate the answer 320. For example, the question 308 indicates "here is a log of problem that I am facing with. Using the system log and the grounding information, what would be a root cause of the problem?" In aspects, the question may be in a natural language.

The answer 320 (root cause) indicates an answer from the generative model. The answer 320 describes a root cause of the problem as indicted in the system log 318. For example, the answer 320 indicates:

"Function A has called a function with a second input parameter value "PRQ" when the second input parameter must be an integer. As a result, the function XYZ caused an unrecoverable memory overflow because the function XYZ does not include an exception handling instruction for a memory overflow situation. Need to revise the code for the function XYZ by adding an exception handler function:

MECX-0001 Exception_MemoryOverflowfor a memory overflow. The following is a sample program instruction for processing a memory overflow exception:

```
--- sample code:
Error_Handler::Exception_MemoryOverflowfo (int p1) {
... Output_SysLog ("[MECX-0001] at {p1}");
end
}"
```

The answer 320 in the example states that the root cause was in the function XYZ in an unrecoverable memory overflow. The function XYZ does not include an exception handling instruction for a memory overflow situation. In particular the second input parameter value "PRQ" was incompatible with the expected parameter type of integer. The answer also includes a suggestion to revise the code for the program instructions to add an exception handler that processes a memory overflow exception in the function XYZ. In aspects, the generative model generates the answer 320 in response to receiving the prompt 302.

FIG. 3B illustrates an example of function hierarchy graph data in accordance with aspects of the present disclosure. Graph 300B indicates hierarchical graph data that represents functions in the program instructions. Each node of the graph 300B corresponds to a function. Each edge represents a directional hierarchical relationship between two functions in a caller-callee relationship. In the graph 300B, Function A 332A is at the highest position in the hierarchical relationship among functions. Each node includes a name and an identifier (e.g., a fingerprint data) of a function. In the graph 300B, function A 332 with an identifier 342A (MEC-0001) is a parent of function AA 334A and function AB 334B. That is, function A 332A calls function AA 334A and function AB 334B.

Function AA 334A has an identifier 344A of "MEC-0002." Function AB 334B has an identifier 344B of "MEC-0003." Similarly, function AA 334A calls function AAA 336A with identifier 346A of "MECX-0001" and function AAB 336B with identifier 346B of "MECX-0002." Function AB 334B calls function ABA 336C with an identifier 346C of "MECX-0003." For example, function AB 334B may a division function that performs division of given numerical values. The division function may call function ABA 336C as an exception handler function with an identifier 346C of "MEX-0003" as fingerprint data. The exception handler function processes memory overflow in the event of performing an operation of division of a given numerical value by zero. The identifiers associated with the respective functions are used in the respective function codes and are recorded in system logs when an event associated with the respective functions occurs.

FIG. 3C illustrates an example of an exception handler function table (e.g., the exception handler function table 216 as shown in FIG. 2) in accordance with aspects of the present disclosure. The exception handler function table 300C includes function identifier 350, function name 352, and description 354.

For example, an entry in the exception handler function table 300C indicates "MEC-0001" as the function identifier 350 (e.g., fingerprint data), "Exception_MemoryOverflow" as the function name 352, and "Exception_MemoryOverflow function processes a memory overflow exception in an edge server." In aspects, the exception handler function table 300C includes a list of exception handler functions that need to be in codes for program instructions. The knowledge base server (e.g., the knowledge base server 210 as shown in FIG. 2) maintains the exception handler function table (e.g., the exception handler function table 216 as shown in FIG. 2). In some aspects, the exception handler function table may include information associated with other types of functions in addition to the exception handler functions.

Furthermore, the exception handler function table 300C includes a function identifier "MECX-0002" which corresponds to a function name of "Exception_InvalidVariableType." The function is associated with a description "Exception_InvalidVariableType function processes an exception as an invalid variable type.

In aspects, the exception handler function table 300C is used as a part of grounding information of a prompt to restrict the generative model to generate an answer to a question in the prompt within a domain as specified by content of the exception handler function table 300C. For example, by including the exception handler function table 300C and the system log that includes fingerprint data as defined in the exception handler function table 300C, the generative model may be instructed to infer a root cause of a problem by identifying an exception handler function associated with fingerprint data in the system log and use descriptions of the exception handler function to identify types of exceptions that occurred in the system.

Figure 4A:
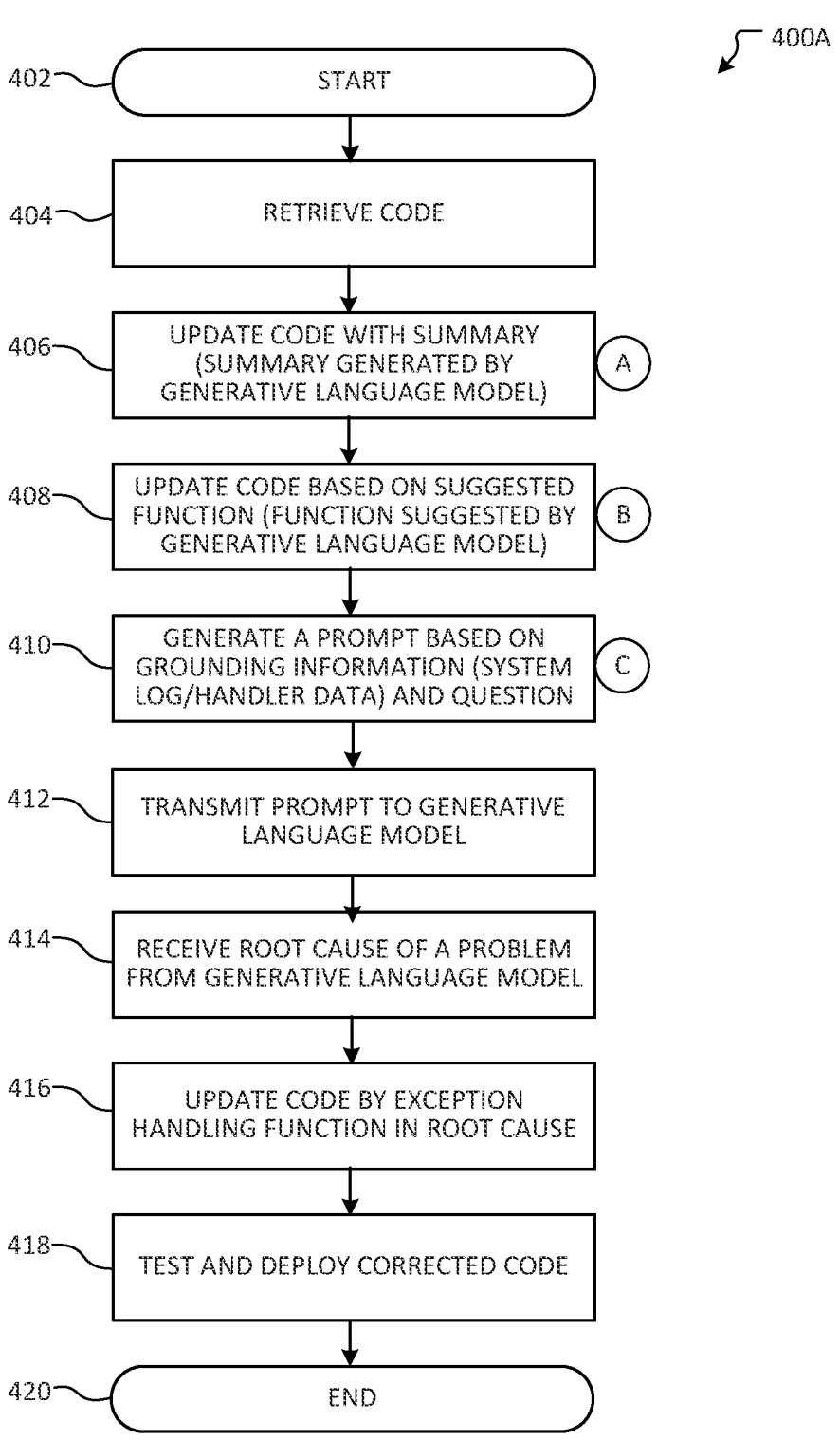
FIG. 4A illustrates an example of a method for determining a root cause of a problem and updating instruction code in accordance with aspects of the present disclosure.

FIGS. 4A-4D illustrate examples of methods in accordance with aspects of the present disclosure. FIG. 4A illustrates an example of a method for determining a root cause of a problem and updating instruction code in accordance with aspects of the present disclosure. A general order of the operations for the method 400A is shown in FIG. 4A. Generally, the method 400A begins with start operation 402 and ends with end operation 420. The method 400A may include more or fewer steps or may arrange the order of the steps differently than those shown in FIG. 4A. The method 400A can be executed as a set of computer-executable instructions executed by a computer system and encoded or stored on a computer readable medium. Further, the method 400A can be performed by gates or circuits associated with a processor, an ASIC, an FPGA, a SOC or other hardware device. Hereinafter, the method 400A shall be explained with reference to the systems, components, devices, modules, software, data structures, data characteristic representations, signaling diagrams, methods, etc., described in conjunction with FIGS. 1, 2, 3A, 3B, 3C, 4B, 4C, 4D, 5A, 5B, 6, 7, and 8.

Following start operation 402, the method 400A begins with retrieve operation 404, in which a code associated with program instructions is received by a knowledge base server (e.g., the knowledge base server 152 as shown in FIG. 1). In aspects, the knowledge base server retrieves code from a code repository database (e.g., the code repository database 156 as shown in FIG. 1). In some aspect, the knowledge base server retrieves the code from code development application (e.g., the code development application 150 as shown in FIG. 1).

In update code with summary operation 406, the code in the program instruction is updated with a summary text that describe the code. In aspects, the update code with summary operation 406 includes requesting for the summary text, receiving the summary text that is automatically generated using a generative model (e.g., the generative model 162 as shown in FIG. 1), and updating the code based on the summary text. The label 'A' corresponds to the method 400B in FIG. 4B. In aspects, the knowledge server recommends the summary text for insertion to the code development application. The code development application may interactively update the code by inserting the summary text into the code.

In update code with function operation 408, the code in the program instruction is updated according to a function as suggested by the generative model. In aspects, the update code with function operation 408 includes requesting for a suggestion on a function to insert to the code. The suggestion is generated by using the generative model based on the retrieved code and data in an exception handler function table (e.g., the exception handler function table 216 as shown in FIG. 2). The label 'B' corresponds to the method 400C in FIG. 4C.

In generate a prompt operation 410, a prompt is generate based on grounding information as a prefix and a question.

In aspects, the grounding information includes data from a system log and the exception handler function table. The label 'C' corresponds to the method 400D in FIG. 4D.

In transmit operation 412, the prompt is transmitted to the generative model (e.g., the generative language model, a large language model, or a pre-trained transformer model, and the like). In some aspects, the knowledge base server may request prompt generator (e.g., the prompt generator 160) to generate the prompt before transmitting the prompt to the generative model. The transmission of the prompt causes the generative model to generate a natural language text that describes a root cause associated with a problem that is indicated in the system log.

In receive operation 414, the natural language text that describes a root cause for a problem is received from the generative model. In aspects, the root cause may include a description of a cause of the problem and identifies a portion of codes in the program instructions associated with the root cause. In some aspects, the natural language text that describes the root cause associates the root cause with the portion of codes based on an identifier of an exception handler and other types of handlers of functions in the system log.

In update code operation 416, a function code is suggested for updating the code to address the root cause of the problem. In aspects, the knowledge base server may notify the code development application with the function code (e.g., a sample code snippet of a missing exception handler function) as a suggestion for updating the program instruction. In some other aspects, the knowledge base server may insert the sample function code as a sample in the program instruction in the code repository database (e.g., the code repository database 156 as shown in FIG. 1) to enable an application developer to interactively edit the program instruction using the code development application at a later time.

In test and deploy operation 418, the corrected code is tested and deployed to the 5G/6G MEC and core network system. In aspects, the knowledge base server may retrieve the corrected code from the code repository database and transmits the corrected code for testing and for deployment if the code passes the test. The method 400A ends with the end operation 420.

As should be appreciated, operations 402-420 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 4B:
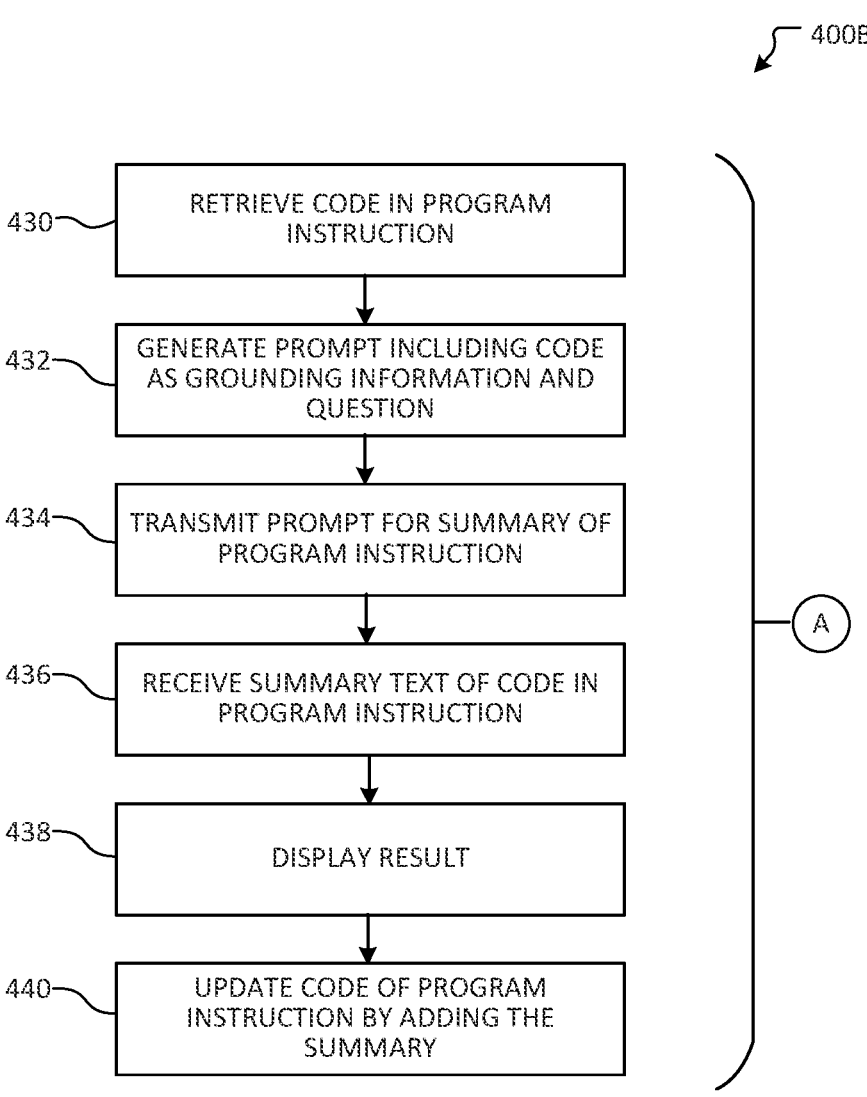
FIG. 4B illustrates an example of a method for inserting a summary text to program instruction using a generative model in accordance with aspects of the present disclosure.

FIG. 4B illustrates an example of a method for inserting a summary text to program instruction using a generative model in accordance with aspects of the present disclosure. A general order of the operations for the method 400B is shown in FIG. 4B. Generally, the method 400B begins with retrieve code operation 430 and ends with update code operation 440, as denoted by the label 'B.' The method 400B may include more or fewer steps or may arrange the order of the steps differently than those shown in FIG. 4B. The method 400B can be executed as a set of computer-executable instructions executed by a computer system and encoded or stored on a computer readable medium. Further, the method 400B can be performed by gates or circuits associated with a processor, an ASIC, an FPGA, a SOC or other hardware device. Hereinafter, the method 400B shall be explained with reference to the systems, components, devices, modules, software, data structures, data characteristic representations, signaling diagrams, methods, etc., described in conjunction with FIGS. 1, 2, 3A, 3B, 3C, 4A, 4C, 4D, 5A, 5B, 6, 7, and 8.

The method 400B begins with the retrieve code operation 430, in which a code in program instruction is retrieved. In aspects, the knowledge base server may retrieve the code from the code repository database or from the code development application. The code is in need for adding a summary text that describes at least a part of the code. Additionally, or alternatively, the code is in need for adding one or more missing functions. For example, the code may be missing an exception handler function code.

In generate prompt operation 432, a prompt is generated. The prompt may include code as grounding information. The prompt may further include a question that requests the generative model to summarize the code.

In transmit prompt operation 434, the prompt is transmitted to the generative model, causing the generative model to generate a summary text according to the prompt. The summary text summarizes the code.

In receive result operation 436, a summary text is received from the generative model. The summary text may be in a natural language. In aspects, the summary text summarizes at least a part of the code.

In display operation 438, the summary text may be displayed for further interactive editing and for interactive confirmation. In aspects, the knowledge base server may interactively display the summary text and the code. In some other aspects, the knowledge base server may transmit the summary text to the code development application, causing the code development application to display the summary text to a code developer.

In update code operation 440, the summary text may be inserted into the code of the program instruction. In some aspects, the knowledge base server may insert the summary text to the exception handler function table when the summary text is associated with one or more of the exception handlers functions in the exception handler function table. In some other aspect, the knowledge base server may store the summary text in association with the code in the code repository database.

As should be appreciated, operations 430-440 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 4C:
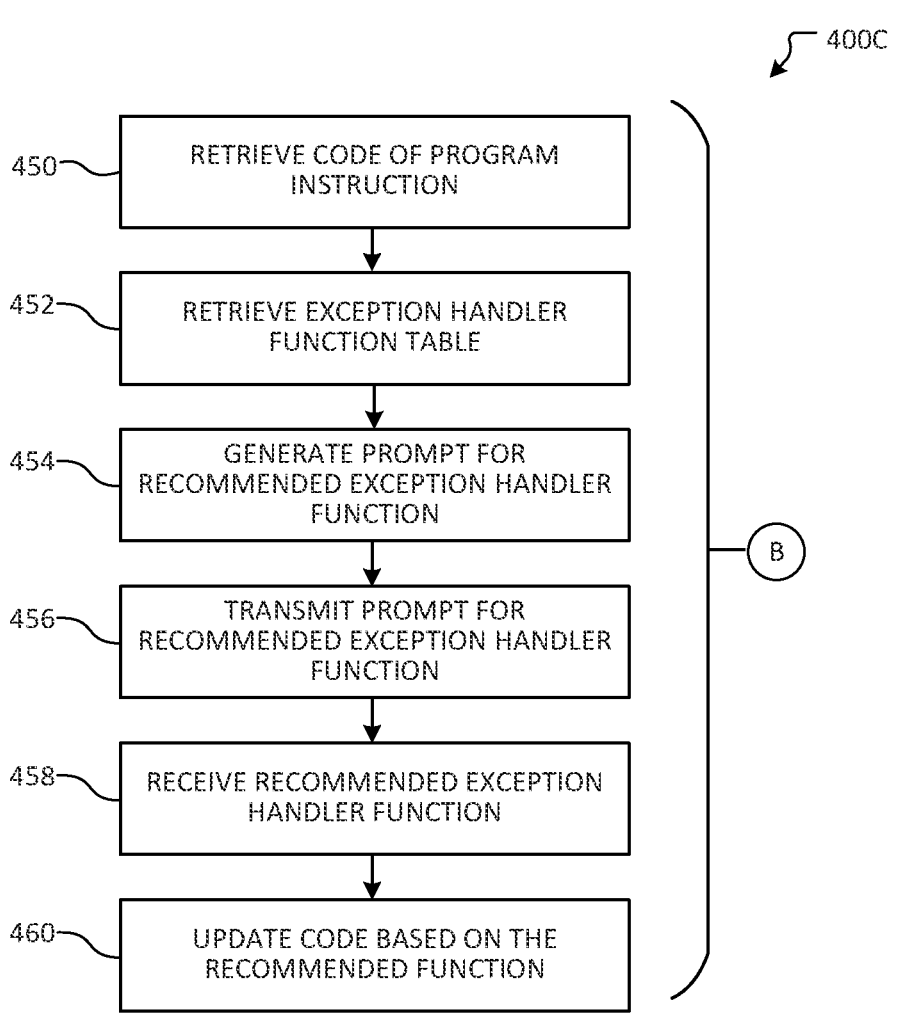
FIG. 4C illustrates an example of a method for updating instruction code based on a suggested exception handling function in accordance with aspects of the present disclosure.

FIG. 4C illustrates an example of a method for updating instruction code based on a suggested exception handling function in accordance with aspects of the present disclosure. A general order of the operations for the method 400C is shown in FIG. 4C. Generally, the method 400C begins with retrieve code operation 450 and ends with update code operation 460, as denoted by the label 'B.' The method 400C may include more or fewer steps or may arrange the order of the steps differently than those shown in FIG. 4C. The method 400C can be executed as a set of computer-executable instructions executed by a computer system and encoded or stored on a computer readable medium. Further, the method 400B can be performed by gates or circuits associated with a processor, an ASIC, an FPGA, a SOC or other hardware device. Hereinafter, the method 400C shall be explained with reference to the systems, components, devices, modules, software, data structures, data characteristic representations, signaling diagrams, methods, etc., described in conjunction with FIGS. 1, 2, 3A, 3B, 3C, 4A, 4B, 4D, 5A, 5B, 6, 7, and 8.

The method 400C begins with the retrieve code operation 450, in which a code for the program instruction is retrieved. In aspects, the knowledge base server may retrieve the code from the code repository database or from the code development application. The code is in need for adding a summary text that describes at least a part of the code. Additionally, or alternatively, the code is in need for adding one or more missing functions. For example, the code may be missing an exception handler function code.

In retrieve exception handler function table operation 452, the exception handler function table is retrieved. In aspects, the exception handler function table includes a list of information associated with exception handler functions. In some aspects, the exception handler function table includes an identifier (e.g., fingerprint data), a name, and a textual description of an exception handler functions. In some other aspects, distinct parts of program instructions being executed in distinct parts of the 5G/6G MEC and core network system may include distinct sets of exception handler functions to process exceptions that may occur in respective parts of the system. The method 400C may enable identifying missing exception handler functions in the retrieved code of program instruction. The table may include various types of handler functions other than exception handlers as needed to be a part of code for program instruction.

In generate prompt operation 454, a prompt for recommended (or needed) exception handler function is generated. In aspects, the prompt includes a prefix and a question. The prefix may include grounding information, which restricts a domain of an answer to be generated by the generative model. For example, the grounding information may include the exception handler function table and the retrieved code. The question may indicate a request for generating a natural language text that describes one or more exception handler function to be added to the code.

In transmit prompt operation 456, the prompt for recommended exception handler function is transmitted to the generative model. The transmission of the prompt causes the generative model to generate a natural language answer, which indicates one or more recommended exception handler functions for insertion into the code.

In receive recommended exception handler function operation 458, the answer that describes one or more recommended exception handler function is received by the knowledge server. In some aspects, the answer includes a sample code snippet for the recommended exception handler function.

In update code operation 460, the recommended exception handler function may be inserted into the retrieved code either through manual operations or automatically. In some aspects, the update code operation 460 may transmit the sample code snippet for the recommended exception handler function to the code development application. The code development application displays the code snippet for interactively inserting the code snippet. In some other aspects, the knowledge base server may store the exception handler function with the sample code snippet in the code repository database by associating the sample code snippet with the retrieved code.

As should be appreciated, operations 450-460 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 4D:
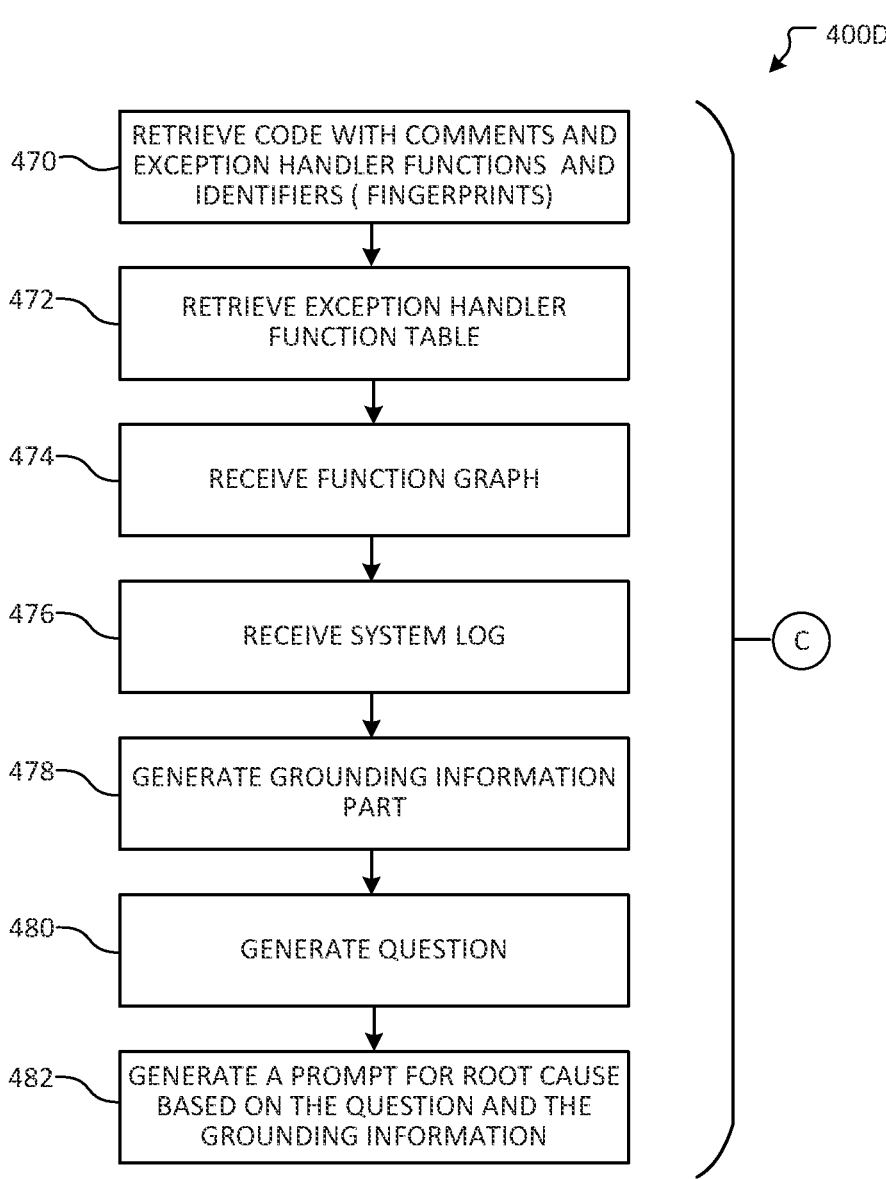
FIG. 4D illustrates an example of a method for generating a prompt for determining root cause for root cause of a problem in accordance with aspects of the present disclosure.

FIG. 4D illustrates an example of a method for generating a prompt for determining root cause for root cause of a problem in accordance with aspects of the present disclosure. A general order of the operations for the method 400D is shown in FIG. 4D. Generally, the method 400B begins with retrieve code operation 470 and ends with generate a prompt operation 482, as denoted by the label 'C.' The method 400D may include more or fewer steps or may arrange the order of the steps differently than those shown in FIG. 4D. The method 400D can be executed as a set of computer-executable instructions executed by a computer system and encoded or stored on a computer readable medium. Further, the method 400D can be performed by gates or circuits associated with a processor, an ASIC, an FPGA, a SOC or other hardware device. Hereinafter, the method 400D shall be explained with reference to the systems, components, devices, modules, software, data structures, data characteristic representations, signaling diagrams, methods, etc., described in conjunction with FIGS. 1, 2, 3A, 3B, 3C, 4A, 4B, 4C, 5A, 5B, 6, 7, and 8.

The method 400C begins with the retrieve code operation 470. In aspects, the code includes a summary text associated with at least a part of the code as described by the method 400A. In some other aspects, the code includes exception handler functions with identifiers (e.g., fingerprint data that identify the respective exception handler functions) as described by the method 400B.

In retrieve exception handler list operation 472, the exception handler function table is retrieved by the knowledge server. In aspects, the exception handler function table represents a natural language list that describe exception handlers and identifiers (e.g., fingerprint data) being used by codes of program instructions in at least a part of the 5G/6G MEC and core network system.

In retrieve function graph operation 474, a hierarchical function graph is retrieved by the knowledge base server. In aspects, the hierarchical function graph indicates a hierarchical relationship among functions in program instruction. (See also, the graph 300B in FIG. 3B.) The graph specifies which function(s) invoke other function(s).

In receive system log operation 476, at least a part of the system log is retrieved. In aspects, the system log may include at least a part of one or more of various types of system logs in the 5G/6G MEC and core network system. Examples of the system log may include RAN log, core network log, and cloud log. (See, the system log 166a including the RAN log database 166b, the core network log database 166c, and the cloud log database 166d as shown in FIG. 1). In some aspects, the knowledge base server may select a particular part of the system log for determining a root cause of a problem that appears in the particular part of the system log.

In generate grounding information part operation 478, grounding information is generated as a prefix for a prompt. In aspects, the grounding information includes the retrieved exception handler function table, the retrieved hierarchical function graph data, and the retrieved system log. The grounding information effectively restricts a root cause analysis as performed by the generative model to output its result within a domain as described by the grounding information.

In generate question operation 480, a question is generated. The question may describe a request for identifying a root cause for a problem as indicated in the retrieved system log. See, the question 308 as shown in FIG. 3A.

In generate prompt operation 482, a prompt for identifying a root cause is generated. The prompt is generated by concatenating the grounding information as a prefix and the question in a natural language text. The method 400D that generates the prompt for a root cause analysis ends with the generate prompt operation 482.

As should be appreciated, operations 470-482 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 5A:
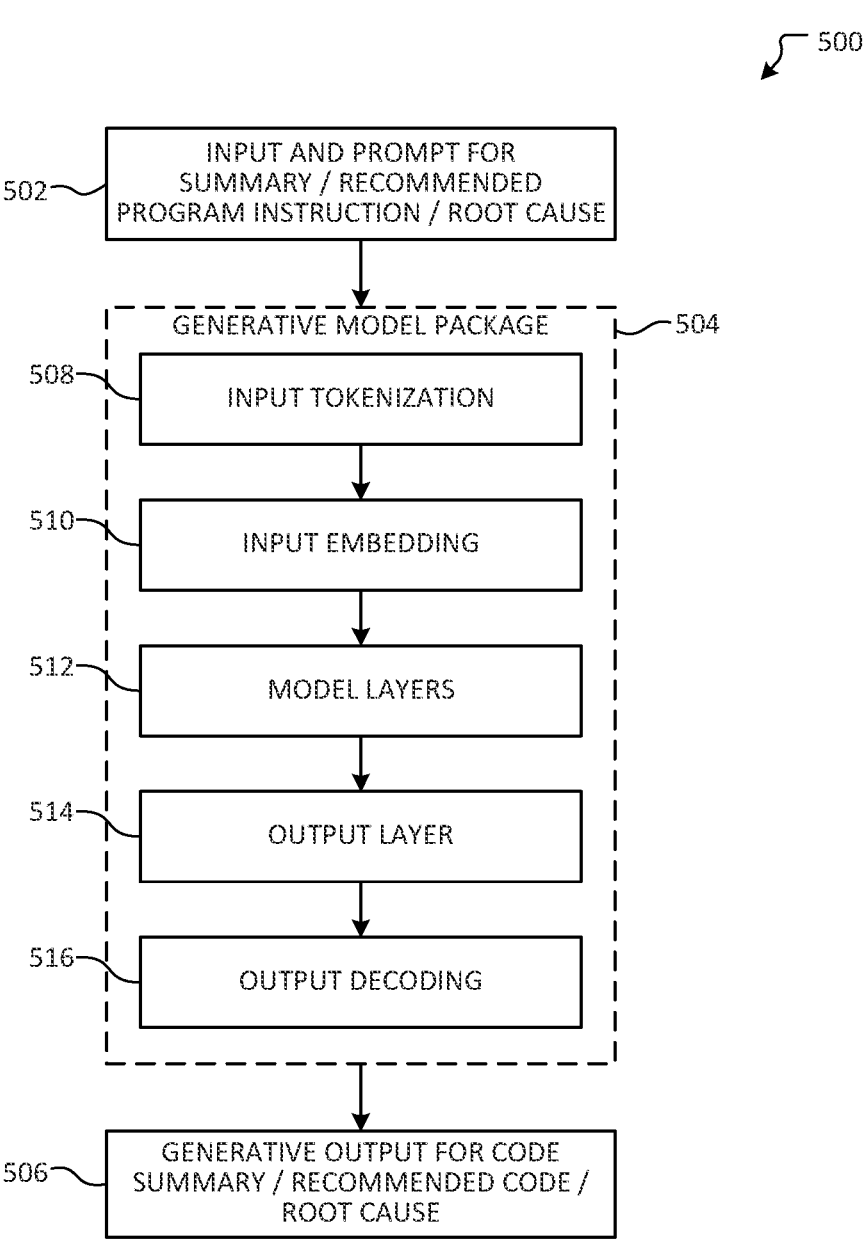
FIGS. 5A and 5B illustrate overviews of an example generative machine learning model that may be used according to aspects described herein.
Figure 5B:
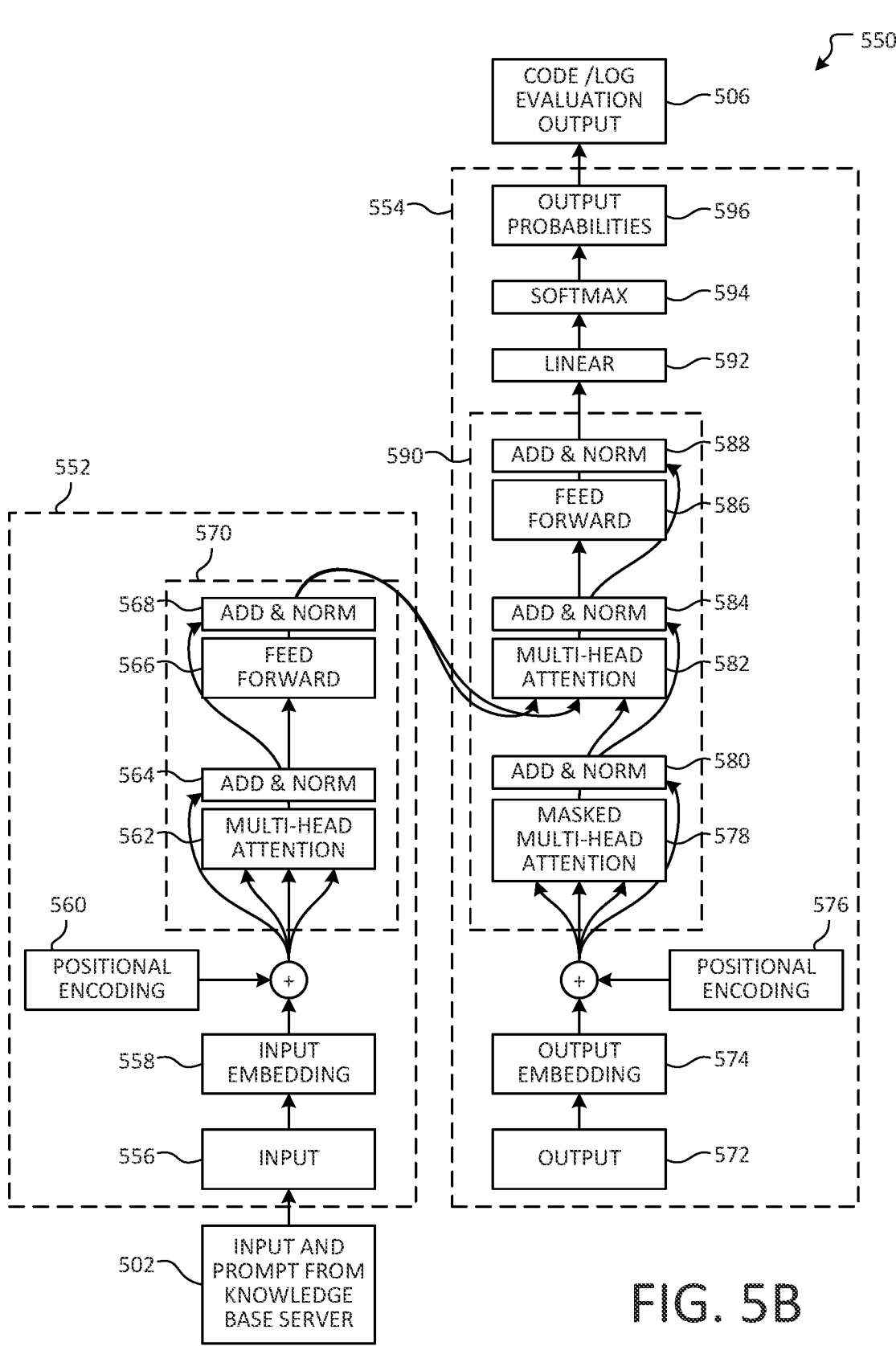

FIGS. 5A and 5B illustrate overviews of an example generative machine learning model that may be used according to aspects described herein. With reference first to FIG. 5A, conceptual diagram 500 depicts an overview of pre-trained, generative model package 504 that processes an input 502 for at least one of summaries of a program instruction snippet, a recommendation for missing program instructions (e.g., an exception handler function), and a root cause of a problem to generate model output for code summary text, recommended code, and a root cause output 506 according to aspects described herein.

In examples, generative model package 504 is pre-trained according to a variety of inputs (e.g., a variety of human languages, a variety of programming languages, and/or a variety of content types) and therefore need not be finetuned or trained for a specific scenario. Rather, generative model package 504 may be more generally pre-trained, such that input 502 includes a prompt that is generated, selected, or otherwise engineered to induce generative model package 504 to produce certain generative model output 506. It will be appreciated that input 502 and generative model output 506 may each include any of a variety of content types, including, but not limited to, text output, image output, audio output, video output, programmatic output, and/or binary output, among other examples. In examples, input 502 and generative model output 506 may have different content types, as may be the case when generative model package 504 includes a generative multimodal machine learning model.

As such, generative model package 504 may be used in any of a variety of scenarios and, further, a different generative model package may be used in place of generative model package 504 without substantially modifying other associated aspects (e.g., similar to those described herein with respect to FIGS. 1 and 2). Accordingly, generative model package 504 operates as a tool with which machine learning processing is performed, in which input 502 to generative model package 504 are programmatically generated or otherwise determined, thereby causing generative model package 504 to produce the generative model output 506 that may subsequently be used for further processing.

Generative model package 504 may be provided or otherwise used according to any of a variety of paradigms. For example, generative model package 504 may be used local to a computing device (e.g., client device 140, edge servers 112, network servers 122, cloud servers 132 in FIG. 1) or may be accessed remotely from a machine learning service (e.g., a knowledge base server 152 and the like in FIG. 1). In other examples, aspects of generative model package 504 are distributed across multiple computing devices. In some instances, generative model package 504 is accessible via an application programming interface (API), as may be provided by an operating system of the computing device and/or by the machine learning service, among other examples.

With reference now to the illustrated aspects of generative model package 504, generative model package 504 includes input tokenization 508, input embedding 510, model layers 512, output layer 514, and output decoding 516. In examples, input tokenization 508 processes the input 502 to generate input embedding 510, which includes a sequence of symbol representations that corresponds to the input 502. Accordingly, input embedding 510 is processed by model layers 512, output layer 514, and output decoding 516 to produce generative model output 506. An example architecture corresponding to generative model package 504 is depicted in FIG. 5B, which is discussed below in further detail. Even so, it will be appreciated that the architectures that are illustrated and described herein are not to be taken in a limiting sense and, in other examples, any of a variety of other architectures may be used.

FIG. 5B is a conceptual diagram that depicts an example architecture 550 of a pre-trained generative machine learning model that may be used according to aspects described herein. As noted above, any of a variety of alternative architectures and corresponding ML models may be used in other examples without departing from the aspects described herein.

As illustrated, architecture 550 processes the input 502 to produce generative model output 506, aspects of which were discussed above with respect to FIG. 5A. Architecture 550 is depicted as a transformer model that includes encoder 552 and decoder 554. Encoder 552 processes input embedding 558 (aspects of which may be similar to input embedding 510 in FIG. 5A), which includes a sequence of symbol representations that corresponds to input 556. In examples, the input 502 (i.e., a prompt) corresponds to the prompt 220 in FIG. 2, the prompt 302 in FIG. 3 and/or a prompt that was generated based on a prompt template according to aspects described herein.

Further, positional encoding 560 may introduce information about the relative and/or absolute position for tokens of input embedding 558. Similarly, output embedding 574 includes a sequence of symbol representations that correspond to output 572, while positional encoding 576 may similarly introduce information about the relative and/or absolute position for tokens of output embedding 574.

As illustrated, encoder 552 includes example layer 570. It will be appreciated that any number of such layers may be used, and that the depicted architecture is simplified for illustrative purposes. Example layer 570 includes two sub-layers: multi-head attention layer 562 and feed forward layer 566. In examples, a residual connection is included around each layer 562, 566, after which normalization layers 564 and 568, respectively, are included.

Decoder 554 includes example layer 590. Similar to encoder 552, any number of such layers may be used in other examples, and the depicted architecture of decoder 554 is simplified for illustrative purposes. As illustrated, example layer 590 includes three sub-layers: masked multi-head attention layer 578, multi-head attention layer 582, and feed forward layer 586. Aspects of multi-head attention layer 582 and feed forward layer 586 may be similar to those discussed above with respect to multi-head attention layer 562 and feed forward layer 566, respectively. Additionally, masked multi-head attention layer 578 performs multi-head attention over the output of encoder 552 (e.g., output 572). In examples, masked multi-head attention layer 578 prevents positions from attending to subsequent positions. Such masking, combined with offsetting the embeddings (e.g., by one position, as illustrated by multi-head attention layer 582), may ensure that a prediction for a given position depends on known output for one or more positions that are less than the given position. As illustrated, residual connections are also included around layers 578, 582, and 586, after which normalization layers 580, 584, and 588, respectively, are included.

Multi-head attention layers 562, 578, and 582 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 5B (e.g., by a corresponding normalization layer 564, 580, or 584).

Feed forward layers 566 and 586 may each be a fully connected feed-forward network, which applies to each position. In examples, feed forward layers 566 and 586 each include a plurality of linear transformations with a rectified linear unit activation in between. In examples, each linear transformation is the same across different positions, while different parameters may be used as compared to other linear transformations of the feed-forward network.

Additionally, aspects of linear transformation 592 may be similar to the linear transformations discussed above with respect to multi-head attention layers 562, 578, and 582, as well as feed forward layers 566 and 586. Softmax 594 may further convert the output of linear transformation 592 to predicted next-token probabilities, as indicated by output probabilities 596. It will be appreciated that the illustrated architecture is provided in as an example and, in other examples, any of a variety of other model architectures may be used in accordance with the disclosed aspects.

Accordingly, output probabilities 596 may thus form the generative model output 506. The generative model output 506 includes at least one of code summary text, recommended code (e.g., an exception handler function), or a root cause of a problem that appears in a system log) according to aspects described herein.

Figure 6:
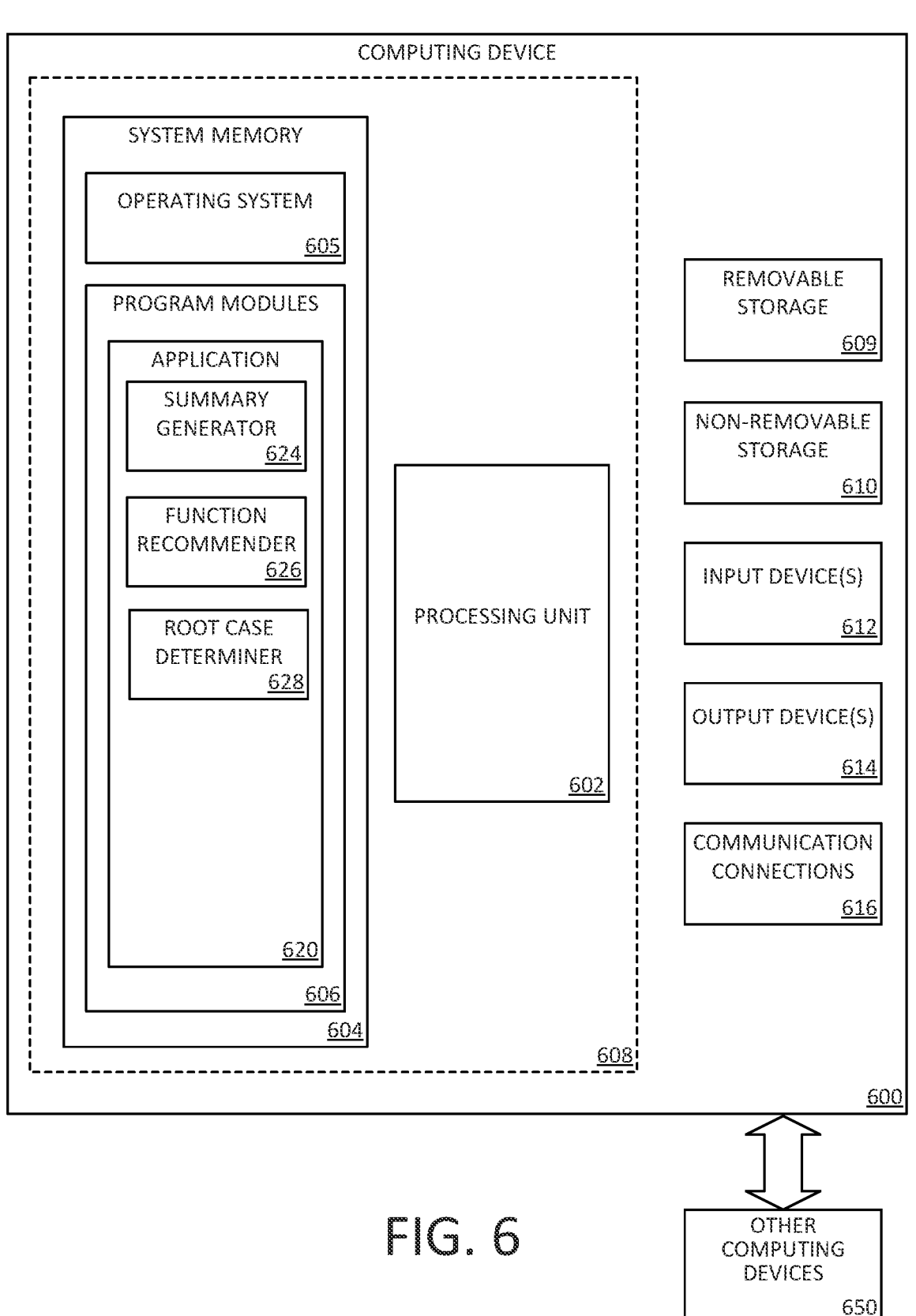
FIG. 6 is a block diagram illustrating example physical components of a computing device with which aspects of the disclosure may be practiced.
Figure 7:
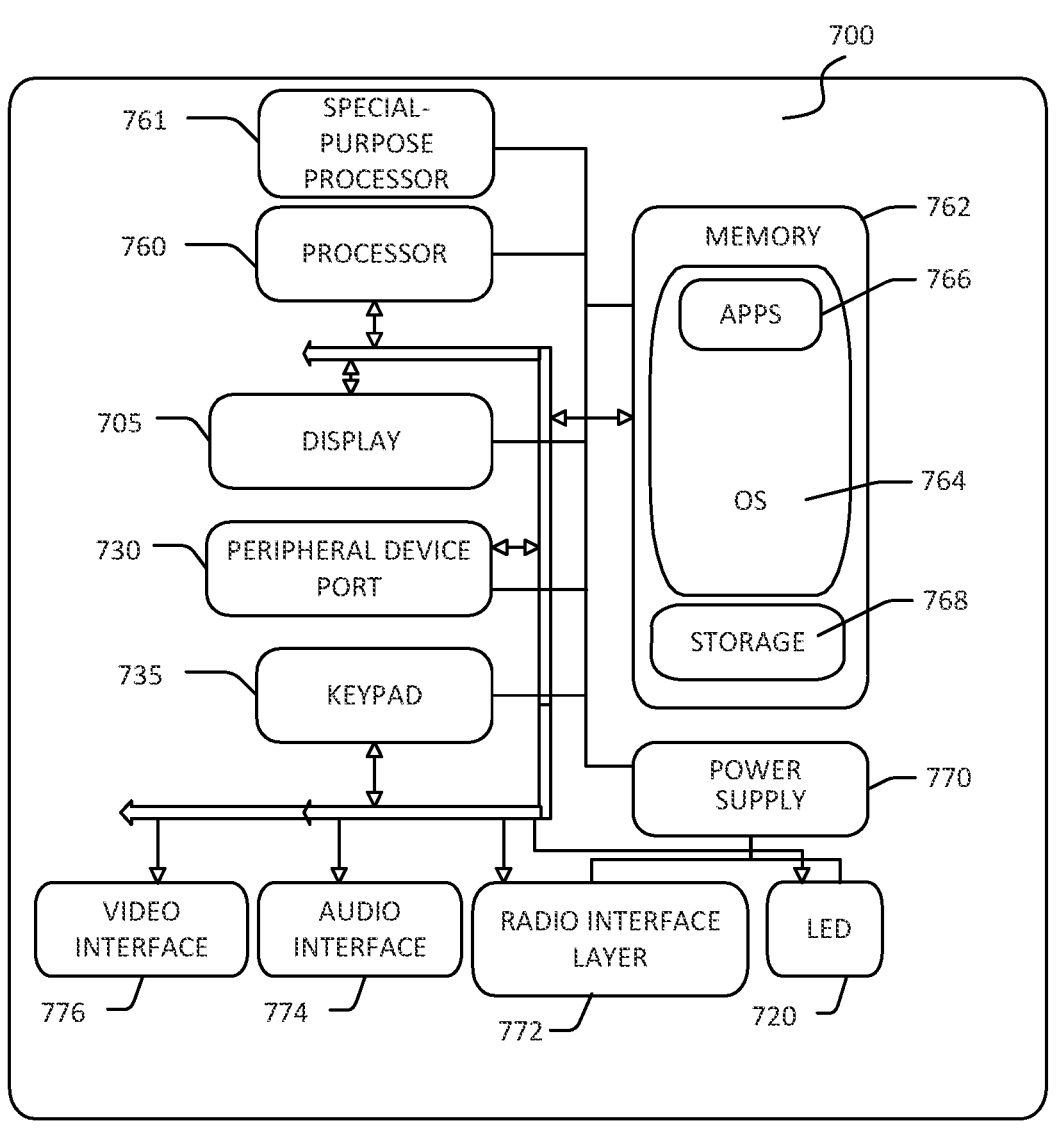
FIG. 7 is a simplified block diagram of a computing device with which aspects of the present disclosure may be practiced.
Figure 8:
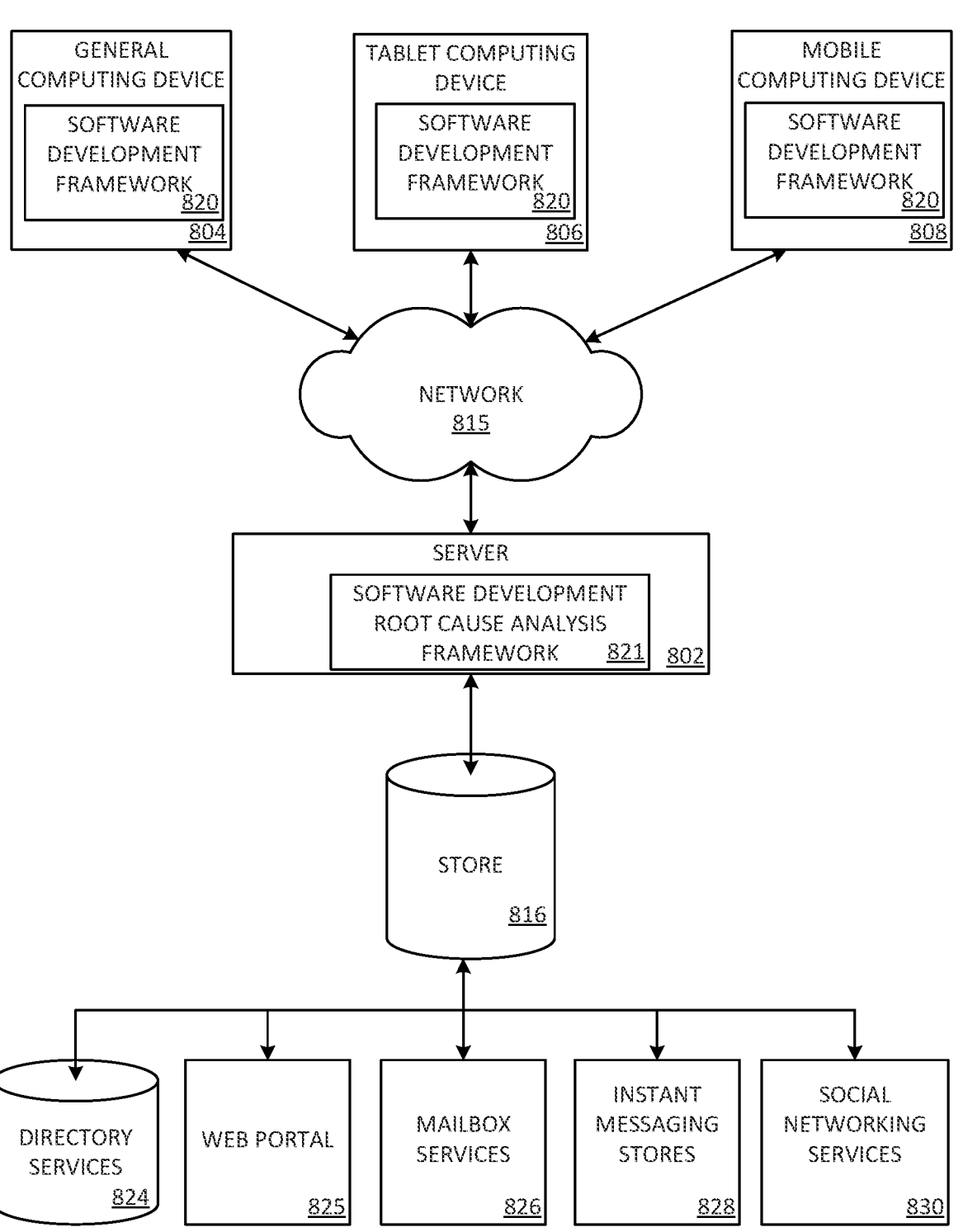
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices described above, including one or more devices associated with a knowledge base server 152, as well as client device 140 discussed above with respect to FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may summary generator 624 and function recommender 626, and root cause determiner 628. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the at least one processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 7 illustrates a system 700 that may, for example, be a mobile computing device, such as a mobile telephone, a smart phone, wearable computer (such as a smart watch), a tablet computer, a laptop computer, and the like, with which embodiments of the disclosure may be practiced. In one embodiment, the system 700 is implemented as a "smart phone" capable of running one or more applications (e.g., browser, e-mail, calendaring, contact managers, messaging clients, games, and media clients/players). In some aspects, the system 700 is integrated as a computing device, such as an integrated personal digital assistant (PDA) and wireless phone.

In a basic configuration, such a mobile computing device is a handheld computer having both input elements and output elements. The system 700 typically includes a display 705 and one or more input buttons that allow the user to enter information into the system 700. The display 705 may also function as an input device (e.g., a touch screen display).

If included, an optional side input element allows further user input. For example, the side input element may be a rotary switch, a button, or any other type of manual input element. In alternative aspects, system 700 may incorporate more or less input elements. For example, the display 705 may not be a touch screen in some embodiments. In another example, an optional keypad 735 may also be included, which may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, a vibration transducer is included for providing the user with tactile feedback. In yet another aspect, input and/or output ports are included, such as an audio input (e.g., a microphone jack), an audio output (e.g., a headphone jack), and a video output (e.g., a HDMI port) for sending signals to or receiving signals from an external device.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser pro-grams, messaging programs, and so forth. The system 700 also includes a non-volatile storage area 768 within the memory 762. The non-volatile storage area 768 may be used to store persistent information that should not be lost if the system 700 is powered down. The application programs 766 may use and store information in the non-volatile storage area 768, such as e-mail or other messages used by an e-mail application, and the like. A synchronization application (not shown) also resides on the system 700 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the system 700 described herein.

The system 700 has a power supply 770, which may be implemented as one or more batteries. The power supply 770 might further include an external power source, such as an AC adapter or a powered docking cradle that supplements or recharges the batteries.

The system 700 may also include a radio interface layer 772 that performs the function of transmitting and receiving radio frequency communications. The radio interface layer 772 facilitates wireless connectivity between the system 700 and the "outside world," via a communications carrier or service provider. Transmissions to and from the radio inter-face layer 772 are conducted under control of the operating system 764. In other words, communications received by the radio interface layer 772 may be disseminated to the appli-cation programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the pres-ent disclosure, the microphone may also serve as an audio sensor to facilitate control of notifications, as will be described below. The system 700 may further include a video interface 776 that enables an operation of an on-board camera 730 to record still images, video stream, and the like.

It will be appreciated that system 700 may have additional features or functionality. For example, system 700 may also include additional data storage devices (removable and/or non-removable) such as, magnetic disks, optical disks, or tape. Such additional storage is illustrated in FIG. 7 by the non-volatile storage area 768.

Data/information generated or captured and stored via the system 700 may be stored locally, as described above, or the data may be stored on any number of storage media that may be accessed by the device via the radio interface layer 772 or via a wired connection between the system 700 and a separate computing device associated with the system 700, for example, a server computer in a distributed computing network, such as the Internet. As should be appreciated, such data/information may be accessed via the radio interface layer 772 or via a distributed computing network. Similarly, such data/information may be readily transferred between computing devices for storage and use according to any of a variety of data/information transfer and storage means, including electronic mail and collaborative data/information sharing systems.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 824, a web portal 825, a mailbox service 826, an instant messaging store 828, or a social networking site 830.

A multi-stage machine learning framework 820 (e.g., similar to the application 620) may be employed by a client that communicates with server device 802. Additionally, or alternatively, software development root cause analysis framework 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these examples of the computing devices may obtain content from the store 816, in addition to receiving graphical data useable to be either pre-pro-cessed at a graphic-originating system, or post-processed at a receiving computing system.

It will be appreciated that the aspects and functionalities described herein may operate over distributed systems (e.g., cloud-based computing systems), where application func-tionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user inter-faces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for determining a root cause of a problem that arises in the 5G/6G MEC and core network systems using a pre-trained generative model according to at least the examples provided in the sections below. As will be understood of the foregoing disclosing disclosure one aspect of the technology relates to a computer-implemented method. The method comprises retrieving a set of data including: event data of a system log, wherein the event data indicates an incident, function hierarchy graph data, and function information, generating a prompt for transmission to a pre-trained generative model, wherein the prompt includes grounding information and a question, the grounding information includes the event data, the function hierarchy graph data, and the function information, receiving, in response to the transmission of the prompt, a natural language text from the pre-trained generative model, wherein the natural language text includes a description of a root cause associated with the incident, and displaying the description of the root cause. The incident is associated with an error occurred in an edge server of a 5G multi-access edge computing network. The function information includes fingerprint data associated with a function, the event data includes the fingerprint data, and the function hierarchy graph data includes the fingerprint data. The prompt is based on the natural language text. The method further comprises retrieving a code associated with program instruction of an edge server in a 5G MEC system, generating a summary prompt, wherein the summary prompt includes the code as the grounding information, transmitting the summary prompt, receiving a summary text associated with the code from the pre-trained generative model, and displaying the summary text for insertion into the code. The method further comprises retrieving a code associated with program instruction of an edge server in a 5G MEC system, generating a prompt for a missing function call, wherein the prompt for a missing function includes the function information and the code as the grounding information and the question, wherein the question includes a request for identifying a missing exception handler function call in the code, transmitting the prompt for a missing function call, receiving an answer for a missing function call from the pre-trained generative model, wherein the answer for a missing function call includes a textual descriptions of the missing exception handler function call in the code, and the textual descriptions of the missing exception handler function call includes fingerprint data associated with the missing exception handler function call, and displaying a code snippet associated with the missing exception handler function call, wherein the code snippet includes the fingerprint data. The function hierarchy graph data indicates a hierarchical caller-callee relationship between two function calls in program instruction. The description of the root cause associated with the incident comprises fingerprint data identified in the event data, a first textual description of a function call associated with the fingerprint data, a second textual description of the incident according to the fingerprint data, and a sample code of calling an exception handler function call for preventing the incident. The method further comprises retrieving a code associated with the fingerprint data, updating the code according to the sample code, and storing the code in a code repository database.

In another aspect, a system for determining a root cause of an event using a pre-trained generative model is provided. The system comprises a processor, and a memory storing computer-executable instructions that when executed by the processor cause the system to execute operations comprising retrieving a set of data including event data of a system log, wherein the event data indicates an incident, function hierarchy graph data, and function information, generating a prompt for transmission to the pre-trained generative model, wherein the prompt includes grounding information and a question, the grounding information includes the event data, the function hierarchy graph data, and the function information, receiving, in response to the transmission of the prompt, a natural language text from the pre-trained generative model, wherein the natural language text includes a description of the root cause associated with the incident, and displaying the description of the root cause. The incident is associated with an error occurred in an edge server of a 5G multi-access edge computing network. The function information includes fingerprint data associated with a function, the event data includes the fingerprint data, and the function hierarchy graph data includes the fingerprint data. The function hierarchy graph data indicates a hierarchical caller-callee relationship between two function calls in program instruction. The description of the root cause associated with the incident comprises fingerprint data identified in the event data, a first textual description of a function call associated with the fingerprint data, a second textual description of the incident according to the fingerprint data, and a sample code of calling an exception handler function call for preventing the incident. The processor is further configured to cause the system to execute operations comprising retrieving a code associated with the fingerprint data, updating the code according to the sample code, and storing the code in a code repository database.

In yet another aspect, a computer-readable recording medium is provided. The computer-readable recording medium stores computer-executable instructions that when executed by a processor cause a computer system to execute operations. The operations comprise retrieving a set of data including event data of a system log, wherein the event data indicates an incident, function hierarchy graph data, and function information, generating a prompt for transmission to a pre-trained generative model, wherein the prompt includes grounding information and a question, the grounding information includes the event data, the function hierarchy graph data, and the function information, receiving, in response to the transmission of the prompt, a natural language text from the pre-trained generative model, wherein the natural language text includes a description of a root cause associated with the incident, and displaying the description of the root cause. The incident is associated with an error occurred in an edge server of a 5G multi-access edge computing network. The function hierarchy graph data indicates a hierarchical caller-callee relationship between two function calls in program instruction. The function information includes fingerprint data associated with a function, the event data includes the fingerprint data, and the function hierarchy graph data includes the fingerprint data. The description of the root cause associated with the incident comprises fingerprint data identified in the event data, a first textual description of a function call associated with the fingerprint data, a second textual description of the incident according to the fingerprint data, and a sample code of calling an exception handler function call for preventing the incident. The processor further causes a computer system to execute operations comprising retrieving a code associated with the fingerprint data, updating the code according to the sample code for preventing the incident from occurring in a subsequent operation, and storing the code in a code repository database.

Any of the one or more above aspects in combination with any other of the one or more aspect. Any of the one or more aspects as described herein.

What is claimed is:

1. A computer-implemented method, comprising:
retrieving a set of data including:
  event data of a system log, wherein the event data indicates an incident,
  function hierarchy graph data, and
  function information;
generating a prompt for transmission to a pre-trained generative model, wherein the prompt includes grounding information and a question, the grounding information includes the event data, the function hierarchy graph data, and the function information, and the grounding information as a part of the prompt causes the pre-trained generative model to identify a root cause of an incident in a predetermined domain as described in the grounding information;
receiving, in response to the transmission of the prompt, a natural language text from the pre-trained generative model, wherein the natural language text includes a description of the root cause of the incident with accuracy by restricting the root cause in the predetermined domain according to the grounding information; and
displaying the description of the root cause.

2. The computer-implemented method according to claim 1, wherein the incident is associated with an error occurred in an edge server of a 5G multi-access edge computing network.

3. The computer-implemented method according to claim 1, wherein the function information includes fingerprint data associated with a function, the event data includes the fingerprint data, and the function hierarchy graph data includes the fingerprint data.

4. The computer-implemented method according to claim 1, wherein the prompt is based on the natural language text.

5. The computer-implemented method according to claim 1, further comprising:
retrieving a code associated with program instruction of an edge server in a 5G MEC system;

generating a summary prompt, wherein the summary prompt includes the code as the grounding information;
transmitting the summary prompt;
receiving a summary text associated with the code from the pre-trained generative model; and
displaying the summary text for insertion into the code.

6. The computer-implemented method according to claim 1, further comprising:
retrieving a code associated with program instruction of an edge server in a 5G MEC system;
generating a prompt for a missing function call, wherein the prompt for a missing function includes the function information and the code as the grounding information and the question, wherein the question includes a request for identifying a missing exception handler function call in the code;
transmitting the prompt for a missing function call;
receiving an answer for a missing function call from the pre-trained generative model, wherein the answer for a missing function call includes a textual descriptions of the missing exception handler function call in the code, and the textual descriptions of the missing exception handler function call includes fingerprint data associated with the missing exception handler function call; and
displaying a code snippet associated with the missing exception handler function call, wherein the code snippet includes the fingerprint data.

7. The computer-implemented method according to claim 1, wherein the function hierarchy graph data indicates a hierarchical caller-callee relationship between two function calls in program instruction.

8. The computer-implemented method according to claim 1, wherein the description of the root cause associated with the incident comprises:
fingerprint data identified in the event data,
a first textual description of a function call associated with the fingerprint data,
a second textual description of the incident according to the fingerprint data, and
a sample code of calling an exception handler function call for preventing the incident.

9. The computer-implemented method according to claim 8, further comprising:
retrieving a code associated with the fingerprint data;
updating the code according to the sample code; and
storing the code in a code repository database.

10. A system for determining a root cause of an event using a pre-trained generative model, the system comprising:
a processor; and
a memory storing computer-executable instructions that when executed by the processor cause the system to execute operations comprising:
  retrieving a set of data including:
    event data of a system log, wherein the event data indicates an incident,
    function hierarchy graph data, and
    function information;
  generating a prompt for transmission to the pre-trained generative model, wherein the prompt includes grounding information and a question, the grounding information includes the event data, the function hierarchy graph data, and the function information, and the grounding information as a part of the prompt causes the pre-trained generative model to identify a root cause of an incident in a predetermined domain as described in the grounding information;

receiving, in response to the transmission of the prompt, a natural language text from the pre-trained generative model, wherein the natural language text includes a description of the root cause of the incident with accuracy by restricting the root cause in the predetermined domain according to the grounding information; and displaying the description of the root cause.

11. The system according to claim 10, wherein the incident is associated with an error occurred in an edge server of a 5G multi-access edge computing network.

12. The system according to claim 10, wherein the function information includes fingerprint data associated with a function, the event data includes the fingerprint data, and the function hierarchy graph data includes the fingerprint data.

13. The system according to claim 10, wherein the function hierarchy graph data indicates a hierarchical caller-callee relationship between two function calls in program instruction.

14. The system according to claim 10, wherein the description of the root cause associated with the incident comprises:

fingerprint data identified in the event data, a first textual description of a function call associated with the fingerprint data, a second textual description of the incident according to the fingerprint data, and a sample code of calling an exception handler function call for preventing the incident.

15. The system according to claim 14, the processor further configured to cause the system to execute operations comprising:

retrieving a code associated with the fingerprint data;

updating the code according to the sample code; and storing the code in a code repository database.

16. A computer storage media storing computer-executable instructions that when executed by a processor cause a computer system to execute operations comprising:

retrieving a set of data including:

event data of a system log, wherein the event data indicates an incident, function hierarchy graph data, and function information;

generating a prompt for transmission to a pre-trained generative model, wherein the prompt includes grounding information and a question, the grounding information includes the event data, the function hierarchy graph data, and the function information, and the grounding information as a part of the prompt causes the pre-trained generative model to identify a root cause of an incident in a predetermined domain as described in the grounding information;

receiving, in response to the transmission of the prompt, a natural language text from the pre-trained generative model, wherein the natural language text includes a description of the root cause of the incident with accuracy by restricting the root cause in the predetermined domain according to the grounding information; and displaying the description of the root cause.

17. The computer storage media of claim 16, wherein the incident is associated with an error occurred in an edge server of a 5G multi-access edge computing network.

18. The computer storage media of claim 16, wherein the function hierarchy graph data indicates a hierarchical caller-callee relationship between two function calls in program instruction, and wherein the function information includes fingerprint data associated with a function, the event data includes the fingerprint data, and the function hierarchy graph data includes the fingerprint data.

19. The computer storage media of claim 16, wherein the description of the root cause associated with the incident comprises:

fingerprint data identified in the event data, a first textual description of a function call associated with the fingerprint data, a second textual description of the incident according to the fingerprint data, and a sample code of calling an exception handler function call for preventing the incident.

20. The computer storage media of claim 19, the processor further causes a computer system to execute operations comprising:

retrieving a code associated with the fingerprint data;

updating the code according to the sample code for preventing the incident from occurring in a subsequent operation; and storing the code in a code repository database.

* * * * *